(12) United States Patent
Maier et al.

(10) Patent No.: US 7,136,765 B2
(45) Date of Patent: Nov. 14, 2006

(54) BURIED OBJECT LOCATING AND TRACING METHOD AND SYSTEM EMPLOYING PRINCIPAL COMPONENTS ANALYSIS FOR BLIND SIGNAL DETECTION

(75) Inventors: Christoph H. Maier, San Diego, CA (US); Ray Merewether, La Jolla, CA (US); Mark S. Olsson, La Jolla, CA (US)

(73) Assignee: DeepSea Power & Light, Inc.

( * ) Notice: Subject to any disclaimer, the term of this patent is extended or adjusted under 35 U.S.C. 154(b) by 0 days.

(21) Appl. No.: 11/205,267

(22) Filed: Aug. 15, 2005

(65) Prior Publication Data

US 2006/0178849 A1    Aug. 10, 2006

Related U.S. Application Data

(63) Continuation of application No. 11/054,776, filed on Feb. 9, 2005.

(51) Int. Cl.
*G01V 3/08* (2006.01)
(52) U.S. Cl. .................. 702/65; 324/326; 385/100; 385/107
(58) Field of Classification Search ............ None
See application file for complete search history.

(56) References Cited

U.S. PATENT DOCUMENTS

| | | | | |
|---|---|---|---|---|
| 4,449,098 A * | 5/1984 | Nakamura et al. | ......... | 324/326 |
| 5,006,806 A * | 4/1991 | Rippingale et al. | ......... | 324/326 |
| 5,116,654 A * | 5/1992 | Cosman et al. | ........... | 428/77 |
| 5,173,139 A * | 12/1992 | Rippingale et al. | ......... | 156/185 |
| 5,206,065 A * | 4/1993 | Rippingale et al. | ......... | 428/98 |
| 5,264,795 A | 11/1993 | Rider | ................. | 324/326 |
| 5,305,410 A * | 4/1994 | Arroyo | ................. | 385/109 |
| 5,305,411 A * | 4/1994 | Arroyo | ................. | 385/109 |
| 5,354,521 A * | 10/1994 | Goodman | .............. | 264/429 |
| 5,426,716 A * | 6/1995 | Arroyo et al. | ........... | 385/100 |
| 5,457,998 A * | 10/1995 | Fujisaki et al. | ........... | 73/657 |
| 5,577,147 A * | 11/1996 | Arroyo et al. | ........... | 385/109 |
| 5,636,305 A * | 6/1997 | Warner et al. | ........... | 385/100 |
| 6,084,495 A * | 7/2000 | Ripingale | .............. | 335/284 |
| 6,188,352 B1 | 2/2001 | Choi et al. | .............. | 342/378 |
| 6,211,807 B1 | 4/2001 | Wilkison | ............... | 342/22 |
| 6,335,624 B1 | 1/2002 | Berthier et al. | ........... | 324/326 |
| 6,690,963 B1 | 2/2004 | Ben-Haim et al. | ........ | 600/424 |
| 2002/0130806 A1 | 9/2002 | Taylor, Jr. et al. | ........ | 342/22 |

OTHER PUBLICATIONS

Barmin, M.P., Ritzwoller, M.H. and Levshin, A.L. "A Fast and Reliable Method for Surface Wave Tomography." *Pure and Applied Geophysics*, 158 (2001) 1351-1375: ©2001, Birkhäuser Verlag, Basel.

(Continued)

Primary Examiner—Carol S. W. Tsai
(74) Attorney, Agent, or Firm—Michael H. Jester

(57) ABSTRACT

A blind locating system for finding and tracing buried objects such as utility lines, conductive pipes and sondes. A sensor array is coupled to a signal processor, which determines a field vector for one or more buried objects by producing a data signal representing a covariance matrix corresponding to the covariances of the time-varying sensor array signals over a selected frequency band and accumulation interval. The covariance matrix is characterized by eigenvalues and associated eigenvectors and a user interface (UI) indicates the field vector associated with the eigenvector having the largest eigenvalue. Using several different frequency bands, a plurality of underground objects may be simultaneously detected and indicated in the UI without foreknowledge of their existence or characteristics.

34 Claims, 12 Drawing Sheets

OTHER PUBLICATIONS

Porter, Frank. "Density Matrix Formalism" Course Notes, Cal Tech Physics Course 125c. pp. 1-28, Jun. 3, 2004.

Wegner, Franz. "Statistical Mechanics" Theoretical Physics IV Manuscript, Heidelberg University, pp. 1-14, © 2002.

* cited by examiner

BURIED OBJECT LOCATING AND TRACING METHOD AND SYSTEM EMPLOYING PRINCIPAL COMPONENTS ANALYSIS FOR BLIND SIGNAL DETECTION

CROSS-REFERENCES TO RELATED APPLICATIONS

This application is related by common inventorship and subject matter to the commonly-assigned patent application Ser. No. 10/268,641 filed on Oct. 9, 2002, patent application Ser. No. 10/308,752 filed on Dec. 3, 2002, and patent application Ser. No. 10/956,328 filed on Oct. 1, 2004, which are all entirely incorporated herein by this reference. This application is a continuation of the commonly-assigned patent application Ser. No. 11/054,776 filed on Feb. 9, 2005.

BACKGROUND OF THE INVENTION

1. Field of the Invention

This invention relates generally to systems for locating and tracing buried objects and more particularly to a system for simultaneously detecting and tracing several buried objects by means of various combinations of active and passive blind signal detection.

2. Description of the Related Art

There are many situations where is it desirable to locate buried utilities such as pipes and cables. For example, prior to starting any new construction that involves excavation, it is important to locate existing underground utilities such as underground power lines, gas lines, phone lines, fiber optic cable conduits, CATV cables, sprinkler control wiring, water pipes, sewer pipes, etc., collectively and individually herein denominated "buried objects." As used herein, the term "buried objects" includes objects located inside walls, between floors in multi-story buildings or cast into concrete slabs, for example, as well as objects disposed below the surface of the ground. If excavation equipment such as a backhoe hits a high voltage line or a gas line, serious injury and property damage may result. Unintended severing of water mains and sewer lines generally leads to messy and expensive cleanup efforts. The unintended destruction of power and data cables may seriously disrupt the comfort and convenience of residents and bring huge financial costs to business.

Accordingly, many solutions to the buried object locating problem have been proposed by practitioners in the art. For example, buried objects may be "passively" located by sensing any electromagnetic signals emitted by the object. Some cables, such as power lines and some communication lines, for example, are already energized and therefore characterized by the emission of an electromagnetic signal, which may be embodied as an elongated electromagnetic field. Other buried objects, such as conductive lines and pipes, may be "actively" located by first applying an external electromagnetic signal to the object and thereby energizing the object to characterize it by the emission of a portion of the external electromagnetic signal. For example, an external electrical signal source having a frequency in a range of approximately 4 Hz to 500 kHz has a well-known utility for energizing conductive objects to permit their passive location when provided with means for external conductive coupling to the object sought. The active/passive location of buried long conductors is commonly denominated "line tracing."

A sonde (also commonly denominated a transmitter, beacon or duct probe) is another embodiment of an external electrical signal source that has a well-known utility for marking nonconductive buried objects to permit their passive location. A sonde typically includes a coil of wire wrapped around a ferromagnetic core that is packaged for insertion into buried nonconductive conduits such as plastic utility runways or concrete water pipes, for example. The coil may be energized with a standard electrical source at a desired frequency, typically in a range of approximately 4 Hz to 500 kHz. The sonde may be attached to a push cable or line or it may be self-contained so that it can be flushed into the conduit with water. A sonde generates a more complex and localized electromagnetic field than that produced by an energized line and may be localized to a single point by exploiting these complexities. A typical low frequency sonde that is useful for single-point localizing does not strongly couple to other objects and thereby avoids the production of complex and unpredictable interfering fields. The term "buried objects" as used herein also includes external buried sondes and passive markers such as the passive marker described by Galloway in U.S. Pat. No. 5,699,048 or Bolson in U.S. Pat. No. 4,712,094, for example.

When locating buried objects prior to excavation, it is further desirable to determine the approximate depth of the objects. This is generally attempted by measuring the characterizing emission field strength at two locations and analyzing the differences.

There are many instances where the land that is to be excavated may be traversed or crisscrossed by several different utilities such as an AC cable, a water line, a gas line, a sewer pipe and a communications line. It is highly desirable to be able to determine their paths and their depths all at the same time. Some transmitters known in the art can produce several different signals at different frequencies for application to the same underground object or even to different underground objects, but a problem with these systems arises when several pipes are located in the same area and the location of all pipes is desired. Signals transmitted by several pipes can interfere and complicate the detection process.

Many practitioners propose various solutions to this multiple signal detection and separation problem. For example, in U.S. Pat. No. 5,264,795, Rider discloses a locating system that includes an encoded digital or analog signal in the transmitter carrier to facilitate identification of a conduit during its active location. Rider neither considers nor suggests solutions to the related passive location problem. More recently, in U.S. Pat. No. 6,211,807, Wilkison discloses a system that actively locates a buried electrically-conductive object characterized by the emission of a spread-spectrum signal impressed on the object. While Wilkison's system is advantageous for the active location of a particular buried object in the presence of "noise" that includes other signal emissions from other buried objects because of the improved signal-to-noise ratio (SNR) and other advantages of spread-spectrum signal processing, these advantages are not applicable to the related passive location problem.

Another problem with buried object locators known in the art is the signal phase relationships from a 3-axis sensor array, which are ambiguous and cannot alone facilitate assembly of the field vector components in the correct quadrant. In the United Kingdom, for example, where passive detection of broadband emissions in the 15–24 kHz band is typically used to find buried wires, available broadband detection methods yield no clearly-defined phase, leaving unresolved ambiguities in the resulting field vector.

Another well-known portable locator problem is the convolution of any locator system operator motion with the received emission signal. In operation, a portable locator system is typically swung side to side or about in a large arc to obtain an initial estimate of the direction to a buried object such as a utility line. Even when tracing a buried utility line following its detection, small path deviations may cause signal phase reversals at the sensors whose axes are aligned substantially perpendicular to the local field vector. This problem arises in some sensor coil embodiments where sensor signal sensitivity is generally proportional to the sine of the angle between the sensor coil axis and the local field vector. When the sensor coil axis is substantially aligned with the local field, the near-zero value for the sine of that angle fluctuates rapidly with the angle so that minute angular changes arising from locator system motion can cause large changes in sensor signal amplitude and phase. Practitioners in the art have proposed no solutions for this particular disadvantageous effect of operator motion.

Accordingly, there is still a clearly-felt need in the art for an improved method for the active and passive detection of buried objects in a crowded or noisy environment. Such a system must provide for the simultaneous detection and identification of either a passively-emitting buried object such as an energized power cable or an actively-energized buried object such as a conductive pipe energized by means of an external transmitter signal or a non-conductive conduit occupied by an energized sonde, or all three such objects simultaneously, for example. These unresolved problems and deficiencies are clearly felt in the art and are solved by this invention in the manner described below.

SUMMARY OF THE INVENTION

This invention solves the above problems by, for the first time, introducing a principle components analysis (PCA) technique to the buried objection detection art for facilitating the blind detection of coherent signal emissions from buried objects. PCA is a useful statistical technique that has found application in fields involving patterns in high-dimensional data such as face recognition and image compression, but has never before been considered or suggested for use in resolving buried object locator problems. As used herein, the terms "blind detection" and "blind location" denominate the detection or location of an signal whose existence and characteristics are unknown.

One embodiment of the blind locating system of this invention locates buried objects such as utility lines, conductive pipes and sondes. A sensor array is coupled to a signal processor, which determines a field at the sensor array for each of one or more buried objects by producing a data signal representing a matrix of the covariances of the time-varying sensor signals over a selected frequency band and accumulation interval. The sensor signal covariance matrix is characterized by eigenvalues and associated eigenvectors and the field vector represented by the eigenvector associated with the largest eigenvalue is indicated to the operator at a user interface (UI) such as a graphical user interface (GUI). In some embodiments, the field vector(s) so determined may then be employed to determine the associated field or field gradient vector and an estimated location vector for the buried object by any of the several useful mathematical and operational methods known in the art. In other embodiments, by using several different frequency bands, a plurality of underground objects may be simultaneously detected, located and indicated in the UI without foreknowledge of their existence or characteristics.

It is a purpose of this invention to simultaneously locate one or more buried objects that are each characterized by a distinct active or passive electromagnetic signal emission, with or without a priori knowledge of any signal emission characteristics other than a general frequency region of interest. The system and method of this invention arose in part from the unexpectedly advantageous observation that the effects of interference and noise fields are spatially decorrelated among the locating sensor assembly elements and thus may be minimized by finding the best correlated sensor signal components. This observation led to a second unexpectedly advantageous observation that such correlated sensor signal components are useful for detecting a signal emission whose existence and characteristics are unknown (i.e., "blind" detection and location). As used herein, a "sensor axis" denominates a spatial direction of maximal sensor sensitivity to an electromagnetic signal field.

It is an important purpose of this invention to provide a system for producing a mapping display of broadband electromagnetic emissions. The active location method of this invention yields a clearly-defined field vector phase, and eliminates the usual ambiguities for broadband electromagnetic emissions. The system of this invention is specifically intended to overcome the field vector ambiguity problem.

It is also a purpose of this invention to provide a system for locating buried objects characterized by non-time-varying electromagnetic signal emissions. An embodiment of this invention employing Hall-effect sensors, for example, may be used to detect emissions from a permanent magnet by processing in accordance with this invention a plurality K of non-zero mean signals $\{S_k(t)\}$ whose variation with time is entirely responsive to operator motion of the locator system relative to the buried target, for example. The brace notation $\{X\}$ herein generally denotes an unordered set of two or more elements.

In an exemplary embodiment, the invention is apparatus for the blind locating of one or more buried objects each characterized by an electromagnetic signal emission, including a sensor assembly with a plurality K of sensors each having a sensor axis and producing a time-varying sensor signal $S_k(t)$, wherein $1 \leq k \leq K$; a processor coupled to the sensor assembly for processing a plurality K of the time-varying sensor signals $\{S_k(t)\}$ representing a first electromagnetic signal emission, with a matrix accumulator for producing a data signal representing a K by K covariance matrix $A_T$ corresponding to the covariances of the time-varying sensor signals $\{S_k(t)\}$ over a selected time interval, wherein covariance matrix $A_T$ is characterized by a plurality K of eigenvalues $\{\lambda_k\}$ and associated eigenvectors $\{V_k\}$ and a calculator for producing a data signal representing a first electromagnetic signal emission field vector that corresponds to the eigenvector $V_1$ associated with the largest $\lambda_1$ of the eigenvalues $\{\lambda_k\}$; and a UI coupled to the processing circuit for indicating the field vector of the first electromagnetic signal emission at the sensor assembly.

In one aspect, the invention is a machine-implemented method for blindly locating an electromagnetic signal emission with respect to a plurality K of electromagnetic sensors each producing a time-varying sensor signal $S_k(t)$, wherein $1 \leq k \leq K$, including the steps of (a) producing a data signal representing a K by K covariance matrix $A_T$ corresponding to the covariances of the plurality K of time-varying sensor signals $\{S_k(t)\}$ over a selected time interval, wherein covariance matrix $A_T$ is characterized by a plurality K of eigenvalues $\{\lambda_k\}$ and associated eigenvectors $\{V_k\}$ and (b) producing a data signal representing a field vector of the electromagnetic signal emission in relation to the electromagnetic sensor plurality, wherein the field vector corresponds to the eigenvector $V_1$ associated with the largest $\lambda_1$ of the eigenvalues $\{\lambda_k\}$.

In another aspect, the invention is a machine-implemented method for blindly locating a plurality E of independent electromagnetic signal emissions with respect to a plurality K of electromagnetic sensors each producing a time-varying sensor signal $S_k(t)$, wherein $1 \leq k \leq K$, the method including the steps of (a) filtering the plurality K of time-varying sensor signals $\{S_k(t)\}$ to obtain a plurality K of band-limited sensor signals $\{S_k(t)\}_f$ for each of a plurality F of predetermined frequency regions; wherein $1 \leq f \leq F$ and (b) processing each of the plurality F of band-limited sensor signal pluralities $\{S_k(t)\}_f$ by performing the steps of (b.1) producing a data signal representing a K by K covariance matrix $A_f$ corresponding to the covariances of the $f^{th}$ plurality K of time-varying sensor signals $\{S_k(t)\}_f$ over a selected time interval, wherein covariance matrix $A_{Tf}$ is characterized by a plurality K of eigenvalues $\{\lambda_k\}_f$ and associated eigenvectors $\{\lambda_k\}_f$, and (b.2) producing a data signal representing a field vector of the $f^{th}$ electromagnetic signal emission at the electromagnetic sensor plurality, wherein the field vector corresponds to the eigenvector $V_{1f}$ associated with the largest $\lambda_{1f}$ the eigenvalues $\{\lambda_k\}_f$.

As used herein, the eigenvalue $\lambda_1$ is proportional to the power of the corresponding electromagnetic signal emission and the square root of the eigenvalue $\lambda_1$ is proportional to the amplitude of the corresponding electromagnetic signal emission at the sensor assembly. As used herein, the term "covariance matrix $A_T$" denominates the matrix of the variances and covariances of a plurality K of any time-varying sensor signals $\{S_k(t)\}$ from Eqn. 4, and the term "correlation matrix" denominates the matrix of the autocorrelations and cross-correlations of a plurality K of any zero-mean time-varying sensor signals $\{S_k(t)\}$ from Eqn. 1.

The foregoing, together with other objects, features and advantages of this invention, may be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing in which like reference designations represent like features throughout the several views and wherein.

DETAILED DESCRIPTION OF THE EMBODIMENTS

Introduction

Figure 1:
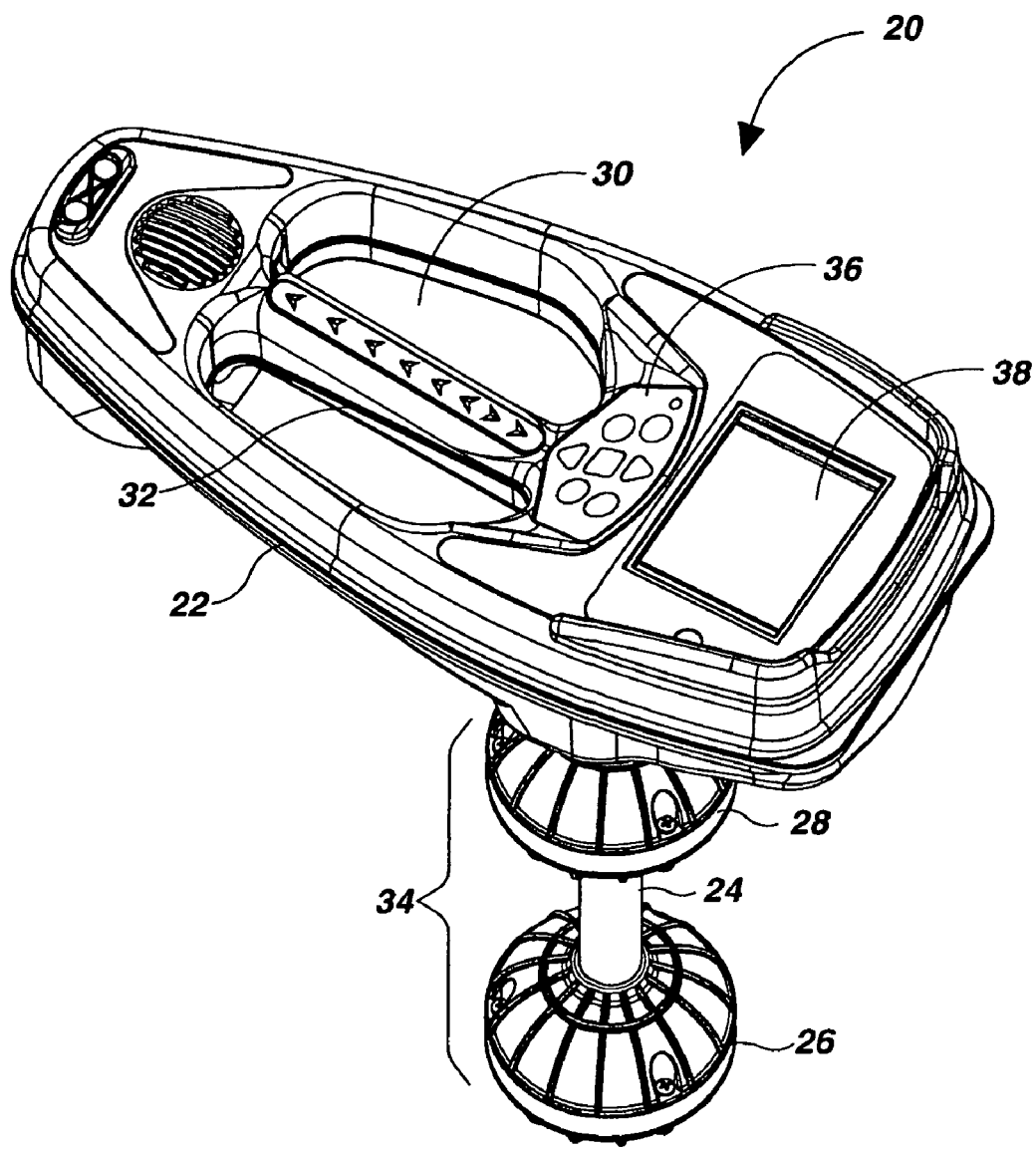
FIG. 1 is a perspective view of an exemplary line locator embodiment having a sensor assembly suitable for use with the system of this invention.

For several detailed discussions of exemplary buried object locator embodiments suitable for use with the system and method of this invention, reference is made to the above-cited commonly-assigned patent applications incorporated herein by reference. For example, FIG. 1 is a perspective view of a battery-powered omnidirectional, portable system 20 useful for locating a buried object by sensing an electromagnetic signal emitted by the buried object. System 20 includes a housing 22 and an elongate member 24 (FIG. 2) that supports spaced apart lower and upper sensor balls 26 and 28, respectively, and connects them to the housing 22. Housing 22 (FIG. 1) includes rigid plastic shells having a large central aperture 30 spanned by a handle portion 32. Lower and upper sensor balls 26 and 28 each include a plurality of electromagnetic sensors (FIG. 3) and together form a sensor assembly 34. Circuit means such as those embodiments described below in connection with FIGS. 5–8, for example, may be disposed partly in housing 22 and (optionally) partly in sensor balls 26 and 28 for processing a time-varying sensor signal $S_k(t)$ from each of a plurality of electromagnetic sensors to detect an electromagnetic signal emission and identify at least one field vector at sensor assembly 34 corresponding to the buried object characterized by such electromagnetic signal emission. As described in detail below, according to this invention, this is accomplished by processing a time-varying sensor signal $S_k(t)$ from each of a plurality of electromagnetic sensors such as those disposed, for example, within sensor balls 26–28. A Graphical User Interface (GUI) mounted in housing 22 includes a keypad 36 and a display 38 (FIGS. 1 and 4) for providing a visual indication of the field vector identified for the buried object. Display 38 is preferably a color or black-and-white Liquid Crystal Display (LCD) to improve battery life, but may include any useful embodiment of a user interface (UI) such as one or more simple indicator lights or meters or a loudspeaker, for example.

Figure 2:
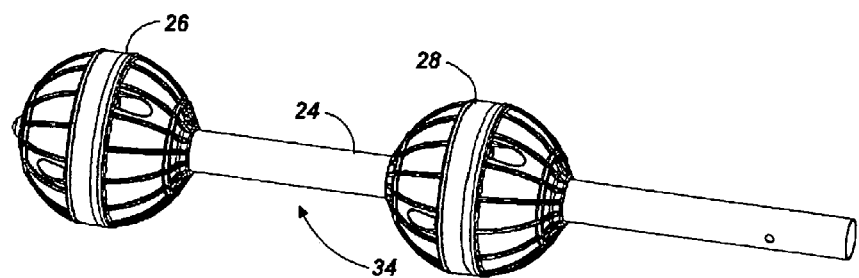
FIG. 2 is an lateral view of the elongate member and two sensor balls of the sensor assembly from the locator embodiment of FIG. 1.

FIG. 2 is an lateral view of sensor assembly 34 showing the relationships between elongate member 24 and sensor balls 26–28. Although this exemplary embodiment of sensor assembly 34 is useful for appreciating the system and method of this invention, the claimed invention is not limited by this example. Other useful embodiments of sensor array 34 may include one or more additional sensor balls (not shown), each similar to lower and upper sensor balls 26–28, for example, or may be limited to a single such sensor ball (e.g., lower sensor ball 26), for example. Alternatively, a single pair of electromagnetic sensors (e.g., two simple coils) in spaced relationship also exemplifies a useful embodiment of sensor array 34.

As used herein, a "sensor" denominates any useful sensor known in the art for sensing electromagnetic field emissions, including sensors responsive to magnetic fields or electric fields or both. Although a simple coil is used herein to exemplify a sensor, the system of this invention may also include any useful electric field sensor and/or any useful magnetic sensor without limitation. Useful electric field sensors include optical E-field sensors using Fabry-Perot sensing cavities, electrolytic silver/silver-chloride E-field sensors and capacitive E-field sensors, for example. Useful magnetic field sensors include flux gate sensors, giant magnetorestrictive (GMR) sensors, super-conducting quantum-interference devices (SQIDs), stub antennas, and Hall-effect sensors, for example. As used herein, a "sensor axis" denominates an axis oriented in a spatial direction of maximal sensor sensitivity to an electromagnetic signal field. As used herein, a "plurality of sensors each having a sensor axis" includes single sensor embodiments having a plurality of sensor axes as well as multiple sensor embodiments having a plurality of single-axis sensors.

Figure 3:
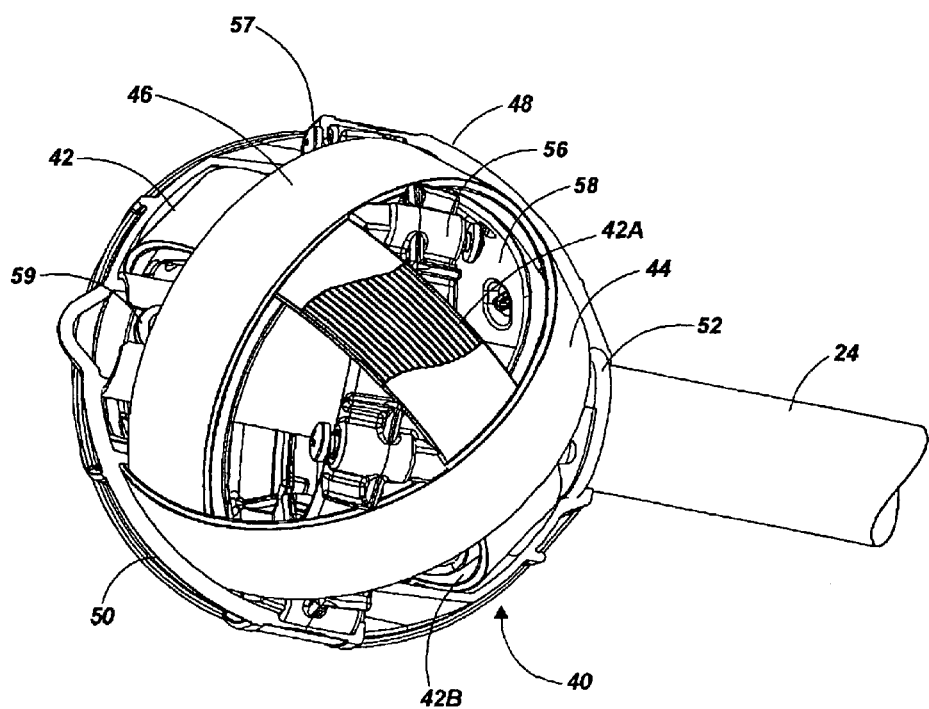
FIG. 3 is an enlarged, breakaway view of the lower sensor ball from the sensor assembly embodiment from FIG. 2.

FIG. 3 is an enlarged, breakaway view of lower sensor ball 26 from sensor assembly 34 from which the internal structure of either of sensor balls 26–28 may be appreciated. Lower sensor ball 26 includes a lower sensor array 40 (FIG. 3) consisting of three sensors 42, 44 and 46 each having a sensor axis (a coil axis in this example) disposed substantially orthogonal to the other two sensor axes. Upper sensor ball 28 includes a similar upper sensor array (not shown). Each sensor exemplified by sensor 42 is formed by a wire coil 42A wrapped around a circular plastic mandrel 42B. Each wire coil exemplified by coil 42A may be segmented to raise its self-resonant frequency and thereby improve the useful frequency range of sensor 42. The wire coils and mandrels for sensors 42–46 may be made progressively smaller or preferably flexible so that sensors 42–46 can be assembled in a nested concentric arrangement substantially as shown. The sensors 42–46 in array 40 share a common center point and are disposed so that each coil axis (not shown) is substantially orthogonal to both of the other coil axes, thereby providing a three-dimensional sensing capability in the well-known manner. Elongate member 24 forms a sensor array mast and is preferably made from aluminum or GRP (fiberglass) or other non-ferrous hollow tube to reduce weight and local magnetic fields. As seen in FIGS. 2 and 3, elongate member 24 extends through each of the nested circular sensors of sensor assembly 34. In this example, the various parts are aligned so that a central axis of the elongate member 24 extends through the common center points of sensor array 40 and a similar sensor array (not shown) in sensor ball 28.

Lower and upper sensor balls 26 and 28 each include generally hemispherical top and bottom molded plastic shells that surround and enclose one or more sensors in a watertight manner. The sensors in lower sensor ball 26 are enclosed by a top shell 48 and a bottom shell 50. Upper and lower sensor balls 26 and 28 are similar except that bottom shell 50 is closed in lower sensor ball 26, whereas top shell 48 has a hole through which elongate member 24 passes. An O-ring 52 provides a seal between top shell 48 and elongate member 24. The sensors (not shown) in upper sensor ball 28 are enclosed by two shells similarly to those in lower sensor ball 26 Top and bottom shells 48 and 50 are secured to a central equatorial support ring 56 with six screws exemplified by the screw 57. Three of these screws secure top shell 48 and three secure bottom shell 50 onto ring 56. Two arched inner shells exemplified by the arched inner shell 58 (only one shown) are mounted top and bottom onto ring 56 to internally support and align the sensors 42–46. A rubber grommet 59 is disposed to protect the wires (not shown) connecting sensors 42–46 to processing electronics (not shown) in housing 22. The seam between top shell 48 and bottom shell 50 is sealed with two layers of tape (not shown), which preferably includes application of a narrow inner taped layer of several wraps followed by a wider outer tape layer that also serves as a label. Reflective labeling tape is preferred for the outer tape layer, to maximize instrument visibility in the field.

Each of sensors 42–46 are wrapped with copper shielding tape on the outside, with the ends of the shielding tape insulated from each other to avoid formation of a shorted turn and a resulting undesirable reduction in the sensitivity of the affected sensor. The shields on each sensor are preferably interconnected, using three short lengths of wire in a star pattern, which are all joined at a single grounding wire. A separate twisted wire pair connects to each of the three sensors and these three pair plus a single ground compose a group of seven wires connecting each sensor ball to the electronics (not shown) in housing 22.

In the above example, according to the system of this invention, sensor assembly 34 is embodied with both sensor balls 26–28 including three substantially orthogonal sensor coils exemplified by sensors 42, 44 and 46. As another example, sensor assembly 34 may be embodied with either of sensor balls 26–28 including three substantially orthogonal sensor coils exemplified by sensors 42, 44 and 46 and the other limited to a single such sensor coil exemplified by sensor 42. As yet another example, sensor assembly 34 may be embodied with both sensor balls 26–28 limited to a single such sensor coil exemplified by sensor 42. Alternatively, sensor assembly 34 may be embodied with three or more sensor balls exemplified by sensor balls 26–28 in any useful physical configuration, such as a lattice of four sensor balls arranged to define a tetrahedron, for example.

Figure 4:
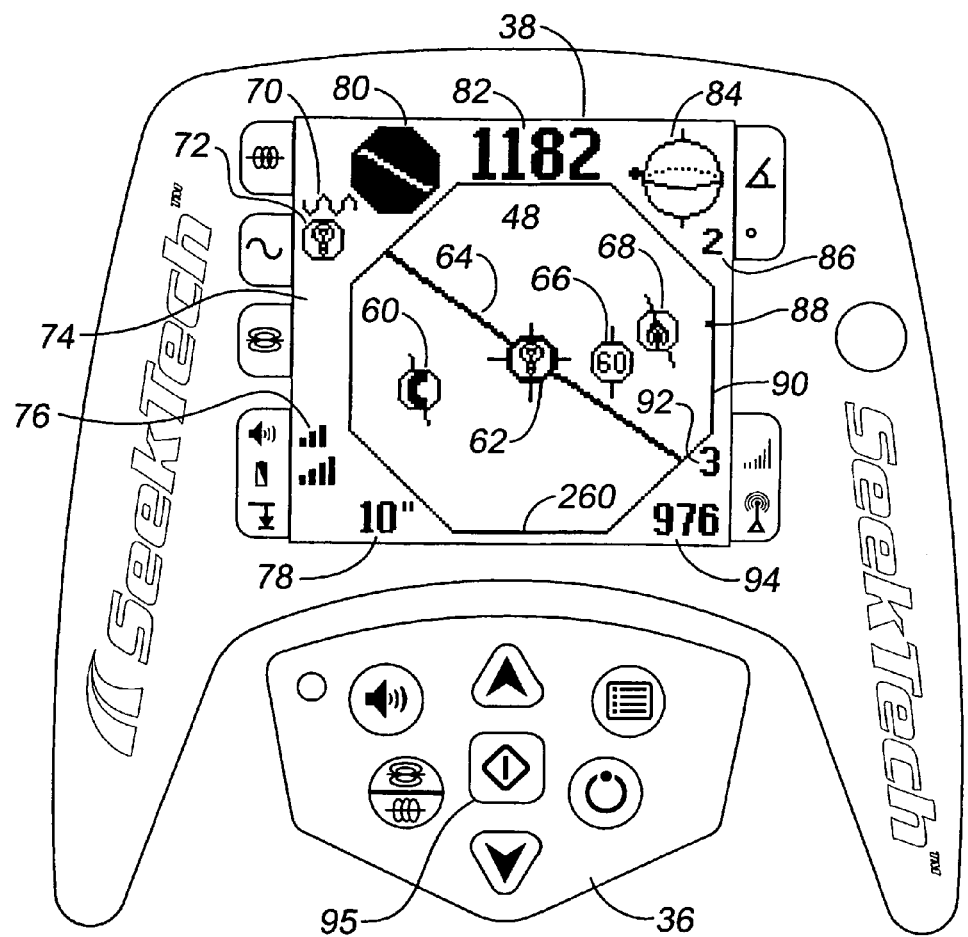
FIG. 4 is an enlarged top plan view of a portion of the housing of the locator embodiment of FIG. 1 illustrating the display and keypad elements of the Graphical User Interface (GUI)

FIG. 4 is an enlarged top plan view of a portion of housing 22 of system 20 illustrating display 38 and keypad 36 and showing an exemplary trace mode MAP view in which the locations of a plurality of different underground utilities are simultaneously visually indicated. A phone utility icon 60 is indicated on display 38 without the line orientation display feature selected. An electric utility icon 62 is indicated on display 38 with the line orientation display feature selected and indicated by a solid bold diagonal line 64. A 60 Hz icon 66 is indicated on display 38 without the line orientation display feature selected. A gas utility icon 68 is indicated on display 38 without the line orientation display feature selected. High, medium and low frequencies are indicated by unique corresponding waveform pattern icons exemplified by the icon 70. The icon 72 in the upper left corner of display 38 indicates the currently selected utility, in this case the electric utility. An AC trace level may be indicated at location 74 but none is illustrated. The audio level currently selected is illustrated by the bar graph 76 on display 38. The depth or distance of the currently selected utility is indicated on the display at 78, which is ten inches in the example of FIG. 4. A 3D field indicator is indicated by the octagon 80 and a signal strength for the selected utility is indicated at 82, which in the example of FIG. 4 is 1182. A 2D horizontal field indicator is indicated at 84. The horizontal angle is digitally indicated on display 38 at 86, which in the example of FIG. 4 is two degrees. A small graphic tab or notch 88 moves clockwise along a large octagonal race track 90 in a clockwise direction to indicate increasing field strength and in a counter-clockwise direction to indicate decreasing field strength. An auto-gain step is digitally indicated at a location 92, which in the example of FIG. 4 is a "3." Finally, a source current level is indicated on display 38 at a location 94, which in the example of FIG. 4 is "976." The highlighted information indicated around the periphery of display 38 that pertains to a specific selected utility changes when the selected utility is changed. Different utilities may be selected by pressing the select key 95 in the center of the keypad 36. Although this exemplary embodiment of GUI keypad 36 and GUI display 38 for indicating one or more signal emission field vectors is useful for appreciating the system and method of this invention, the UI features of this invention are limited only by the claims and not in any way by this example.

Blind Signal Locator Embodiments

Figure 5:
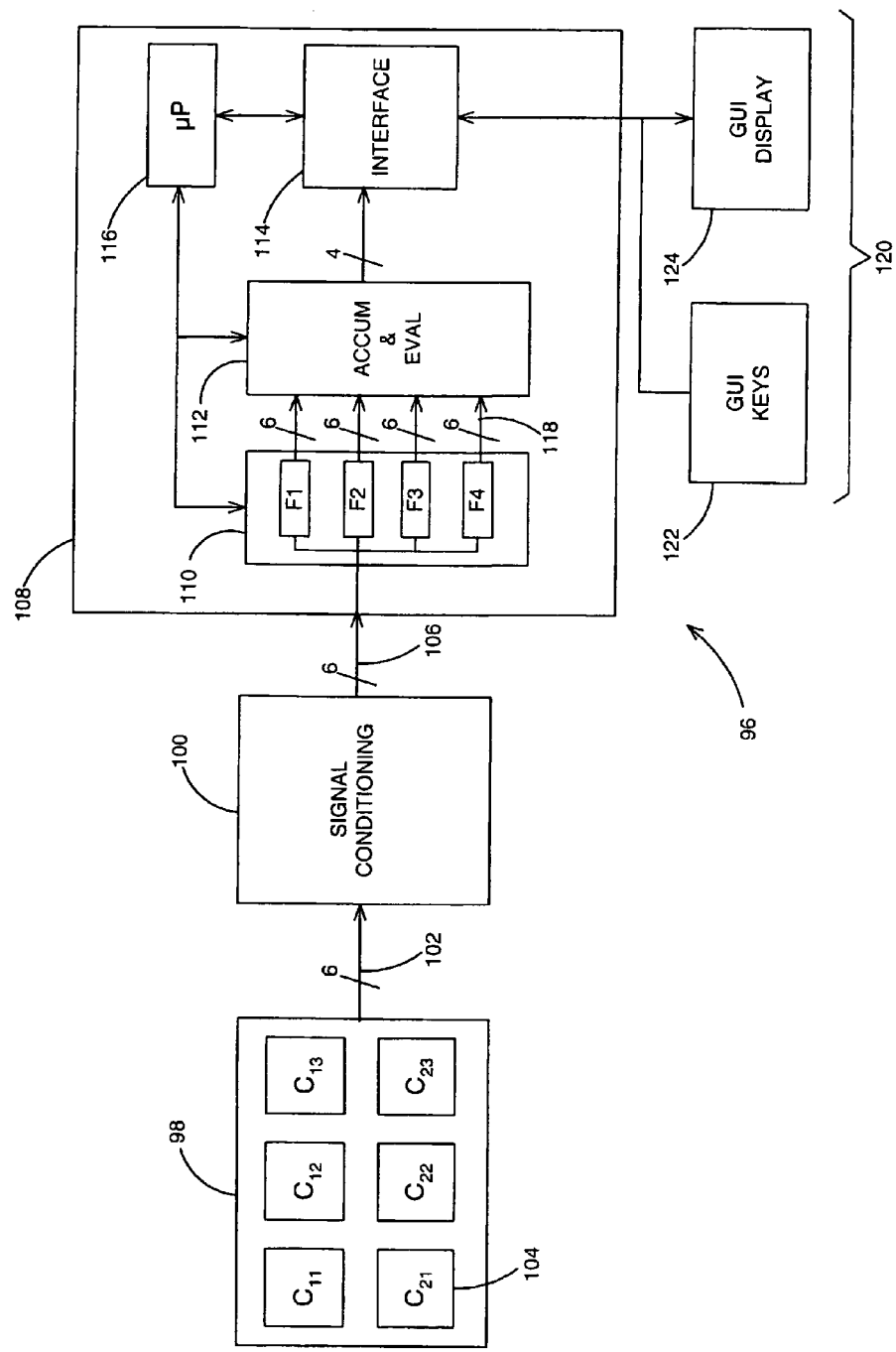
FIG. 5 is a functional block diagram illustrating another exemplary embodiment of the locator apparatus of this invention.

FIG. 5 is a functional block diagram illustrating an exemplary embodiment 96 of the locator apparatus of this invention for the blind location of signal emissions. As used herein, the terms "blind detection" and "blind location" denominate the detection or location of a signal whose existence and characteristics are unknown a priori. Apparatus 96 is shown to include a sensor assembly 98 coupled to a sensor conditioning assembly 100 for amplifying, sampling and digitizing each of the K=6 time-varying signals $\{S_k(t)\}$ 102 produced by sensor assembly 98. Sensor assembly 98 includes K=6 sensor coils exemplified by the coil 104, and is merely one of many possible useful sensor assembly configurations. By way of example, these six sensor coils may be configured as a lower array of three orthogonal sensors ($C_{11}$, $C_{12}$, $C_{13}$) and an upper array of three orthogonal sensors ($C_{21}$, $C_{22}$, $C_{23}$) as described above in connection with FIG. 2.

Six streams of digital signal samples 106 from sensor conditioning assembly 100 are accepted by the processor 108, which is shown as including a bandpass filter logic 110, an accumulator and evaluator logic 112 (described below in connection with the exemplary embodiment of FIG. 8) and an interface logic 114 for routing internal digital signals under the control of a microprocessor 116. By way of example, processor 108 may be embodied as a combination of Digital Signal Processor(DSP) and microcontroller chips, or as a general purpose (GP) computer having a combination of stored software programs suitable for accomplishing the method of this invention, or as any other useful combination consistent with the system and method of this invention.

Bandpass filter logic 110 is shown as including a bandpass filter circuit with F=4 channels, each of which blocks (in the usual manner) the portions of time-varying signals $\{S_k(t)\}$ 102 outside of one of F=4 predetermined frequency regions to produce F=4 independent sets of K=6 band-limited sensor signals $\{S'_k(t)\}$ exemplified by the six band-limited sensor signals $\{S'_k(t)\}$ 118. By way of example, bandpass filter logic 110 may be embodied as one or more Infinite Impulse Response (IIR) digital filters, Finite Impulse Response (FIR) digital filters, Fast Fourier Transform (FFT) digital filters or as any other useful combination consistent with the system and method of this invention.

A GUI 120 is coupled to processor 108 and includes a GUI keypad 122 and a GUI display 124. By way of example, GUI 120 may be embodied as a single touchscreen display device that combines the functions of GUI keypad 122 and GUI display 124, or as a combination of a keypad and a LCD screen, or as a combination of indicator lights and toggle switches, or as any other useful combination consistent with the system and method of the claimed invention. GUI 120 permits a human operator to operate GUI keypad 122 to control the operations of processor 108 and to receive indications on GUI display 124 such as one or more field vectors at sensor assembly 98 for one or more buried objects characterized by electromagnetic signal emissions. Such buried objects may be characterized by electromagnetic signal emissions that are either inherent to the buried object (passive location), conductively or inductively coupled to the buried object from a signal transmitter (active location) or emitted by an energized sonde disposed in an underground cavity or borehole, for example.

Figure 6:
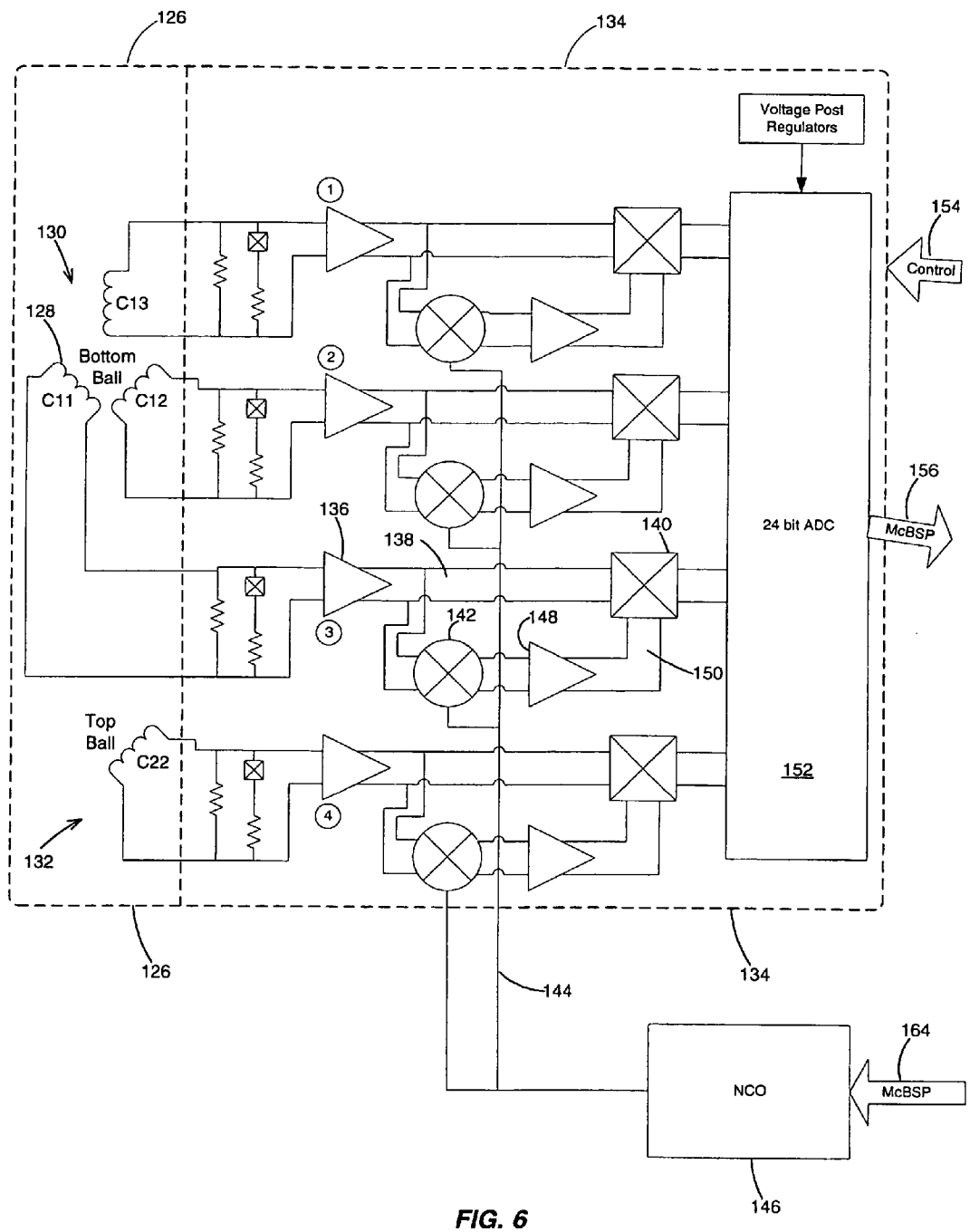
FIG. 6 is a block diagram illustrating yet another embodiment of the sensor and sensor conditioning assemblies of this invention.

FIG. 6 is a block diagram illustrating another embodiment of the sensor and sensor conditioning assemblies of this invention. The sensor assembly 126 includes four sensor coils exemplified by the coil 128. These four sensor coils are configured as a lower sensor array 130 of three orthogonal sensors ($C_{11}$, $C_{12}$, $C_{13}$) and an upper sensor array 132 of one sensor ($C_{22}$) coupled to lower sensor array 130 by, for example, a fixed elongate member (not shown) analogous to elongate member 24 described above in connection with FIG. 2. Each coil is independently coupled to one channel in the analog signal conditioning and digitizing assembly 134, which may be appreciated with reference to the following description of coil 128 ($C_{11}$).

Coil 128 is coupled by way of the appropriate frequency-response conditioning and signal attenuating elements to a preamplifier 136, which produces a low-impedance differential analog time-varying signal $S_3(t)$ 138. Signal $S_3(t)$ 138 is routed directly to the switch 140 and also to the mixer 142 where it is mixed with a local oscillator (LO) signal 144 from a numerically-controlled oscillator (NCO) 146 to produce the usual sum and difference frequencies, which may be low-pass filtered in the usual manner to remove the sum frequencies from the difference frequencies at the input of the isolation amplifier 148, for example. Thus, amplifier 148 produces an intermediate frequency (IF) signal 150 representing time-varying signal 138 shifted down in frequency by an amount corresponding to LO signal 144. Switch 140 may be set or reset to present either time-varying signal $S_3(t)$ 138 or IF signal 150 to the 24-bit Analog-to-Digital Converter (ADC) assembly 152, which produces a digital data signal representing a sample of the selected analog time-varying signal (either signal 138 or signal 150) in the usual manner. IF signal 150 may be preferred when the operator has knowledge of the signal emission sought (active location) and signal 138 may be preferred when the operator has no foreknowledge of the signal emission sought (blind passive location), for example. Responsive to the external control signals 154, ADC assembly 152 thereby produces K=4 streams of digital signal samples 156 representing the K=4 time-varying signals $\{S_k(t)\}$ from sensor assembly 126. As described herein, ADC assembly 152 provides a new signal sample for each sensor signal for every τ seconds, which is herein denominated the sampling interval.

Figure 7:
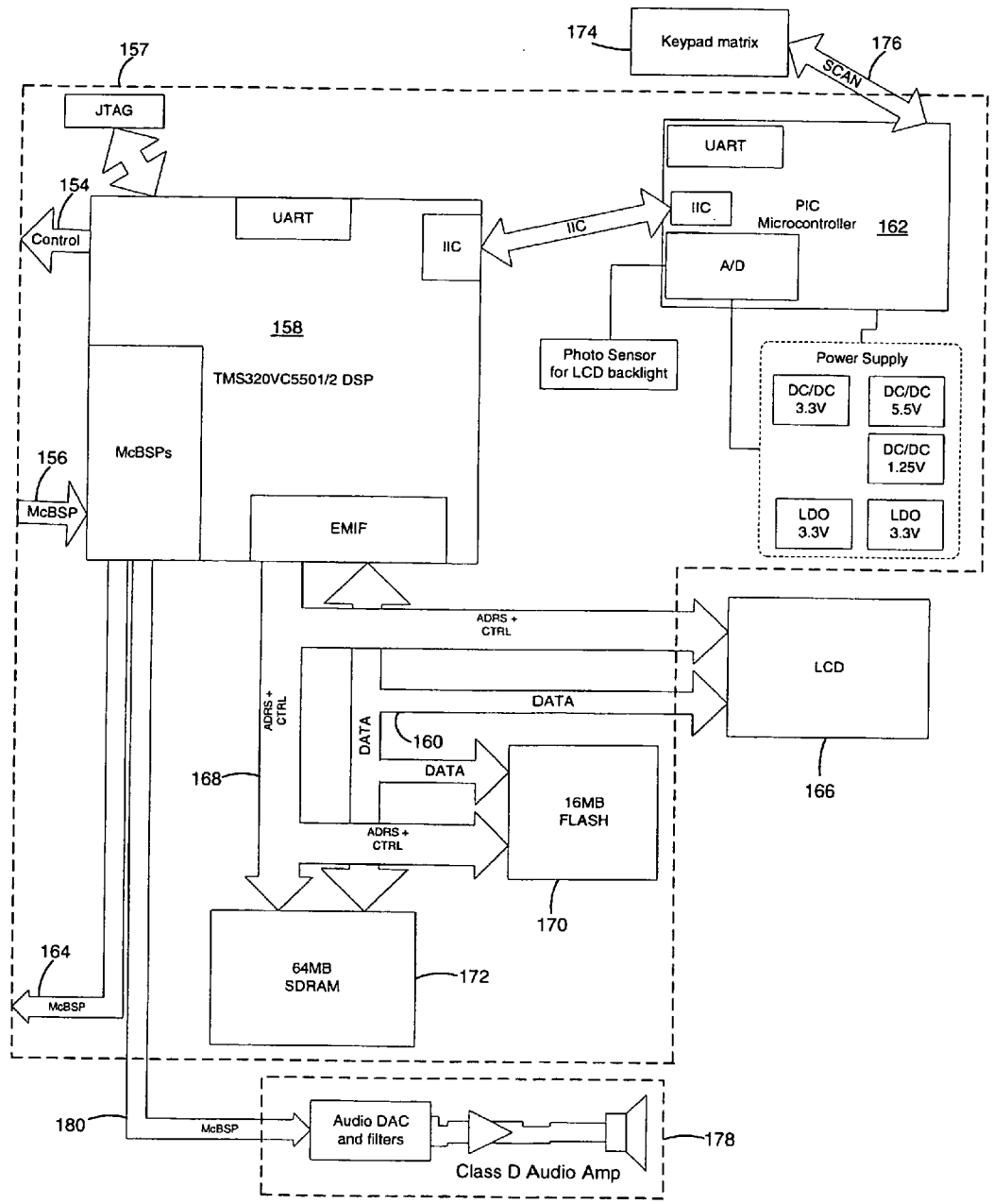
FIG. 7 is a block diagram illustrating yet another embodiment of the processor and GUI assemblies of this invention.

FIG. 7 is a block diagram illustrating another embodiment of the processor and UI assemblies of this invention. The processor assembly 157 accepts digital signal samples 156 from ADC assembly 152 (FIG. 6) at a DSP 158, which includes internal memory (not shown) for storing and executing the accumulator and evaluator software program elements (not shown) required to produce digital data representing buried object emission field vectors on the data bus 160 in the manner described below in connection with FIG. 8. DSP 158 operates under the control of a microcontroller 162 and also produces external control signals 154 for controlling ADC assembly 152 and the clock control signals 164 for controlling NCO 146 (FIG. 6). The GUI LCD 166 is disposed to accept and display digital data representing buried object emission field vectors from data bus 160 under the control of various program instructions transferred on the address and control bus 168. Data bus 160 and control bus 168 are also coupled to a flash memory 170 and a synchronous dynamic random-access memory (SDRAM) 172, which all operate under the control of DSP 158 and serve to store data for program control and display purposes, for example. The GUI keypad 174 is coupled to microcontroller 162 by, for example, a standard matrix scan bus 176, whereby a human operator may insert commands to processor assembly 157. An audio user interface 178 operates to transfer various audio signals to a human operator from the serial bus 180 under the control of DSP 158. As described herein, processor assembly 157 provides a new set of field vectors for every accumulation interval, which is herein defined as a plurality T of the τ-second sampling intervals. As described herein, this plurality T of the τ-second sampling intervals is indexed by the integer t=1, T, where T may vary from one accumulation interval to the next and where sequential accumulation intervals may be either disjoint or overlapping, for example.

The PCA Blind Signal Detection Method

Figure 8:
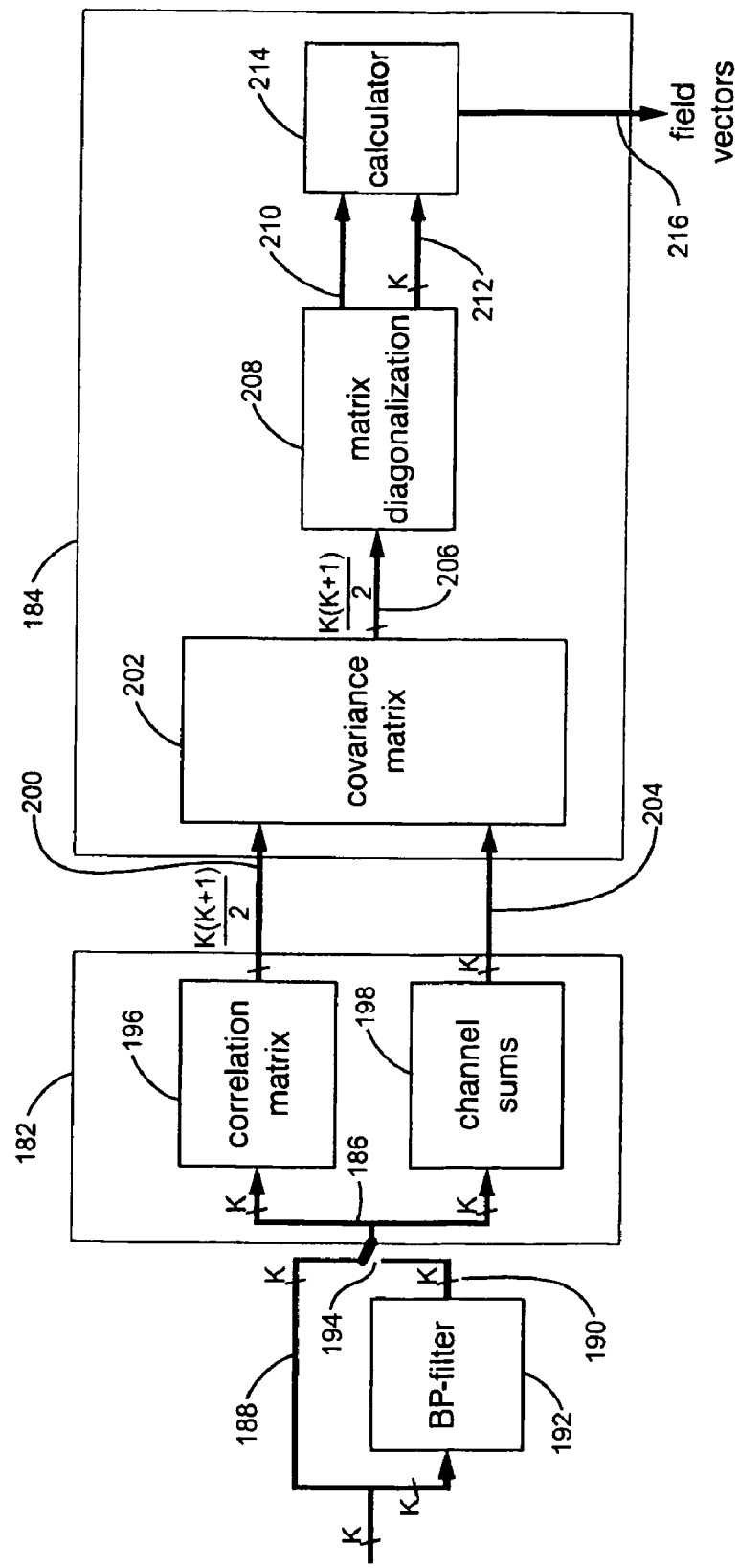
FIG. 8 is a block diagram illustrating exemplary embodiments of the accumulator and evaluator elements of the processor assembly from FIG. 7.

FIG. 8 is a block diagram illustrating exemplary embodiments of matrix accumulator 182 and a vector evaluator 184 that may be embodied in DSP 158 (FIG. 7) or in accumulator and evaluator logic 112 (FIG. 5) to implement a Principle Components Analysis (PCA) technique that is now described in detail.

PCA is a method of multi-variate statistics that exploits the eigenvalues and eigenvectors of the correlation and/or covariance matrices of a sample data set to extract meaning. Also known in the mathematical arts as the Karhunen-Loève transformation, PCA separates the sample data into components that are uncorrelated with one another. For example, classical PCA seeks orthogonal directions of greatest variability by studying projections of the sample data onto direction vectors starting at the sample mean. The variance of these projections is maximized in the direction of the first eigenvector (i.e. the one with the largest corresponding eigenvalue) of, for example, the sample covariance matrix. For additional appreciation of the mathematical background of PCA and the Karhunen-Loève transformation, reference is made to the mathematics textbook "Elementary Linear Algebra 5e" by Howard Anton, Publisher John Wiley & Sons Inc, ISBN 0-471-85223-6, for example.

Referring to FIG. 8, for each of a plurality T of τ-second sampling intervals (t=1, T) in a single accumulation interval, accumulator 182 accepts a plurality K of digital signals 186 representing the $t^{th}$ sample of either a plurality K of time-varying sensor signals $\{S_k(t)\}$ 188 from sensor signal conditioning assembly 100 (FIG. 5) or a plurality K of band-limited sensor signals $\{S'_k(t)\}$ 190 from the bandpass filter 192, depending on the switch 194 position, which is left unchanged during any one accumulation interval. So, when K=4, signals 186 include the samples $\{S_k(t)\}=\{S_1, S_2, S_3, S_4\}_t$ for the $t^{th}$ sampling interval that are accepted by the correlation matrix accumulator 196 and the channel sum accumulator 198.

Correlation matrix accumulator 196 adds the signal sample products $S_iS_j$ for each new plurality K of samples of signals 186 to the existing elements of a symmetric correlation matrix $C_t$ whose elements represent the first expected values of the signal products $E[S_iS_j]$ over the early portion of the accumulation interval at t according to Eqn. 1:

$$C_t = \begin{pmatrix} \overline{S_1S_1} & \cdots & \overline{S_1S_K} \\ \vdots & \ddots & \vdots \\ \overline{S_KS_1} & \cdots & \overline{S_KS_K} \end{pmatrix}. \quad [\text{Eqn. 1}]$$

where E[ ] denotes "first expected value" and the bar notation generally denotes a weighted time average, so $$\overline{x} = \frac{1}{T}\sum_{t=1}^{T}(1-k_t)x_t$$

and, for this embodiment, $k_t=0$ for all t=[1, T].

In the electronics arts, $C_t$ in Eqn. 1 is often called and is herein denominated a "correlation" matrix but this usage is imprecise in the mathematical arts because $C_t$ does not contain the usual statistical correlations $E[(S_i-\mu_i)(S_j-\mu_j)]/(\sigma_i\sigma_j)$ between the time-varying sensor signals $\{S_k(t)\}$ but rather merely the expected values of the products $E[S_iS_j]$ between the signals $\{S_k(t)\}$. As is well-known, cross-correlation is generally defined as the convolution of two complex functions of real time, which for continuous time may be written $$Cor(X, Y) = \int_{-\infty}^{\infty} X^*(t)Y(t+\tau)dt$$

where the asterisk denotes complex conjugate. For this exemplary embodiment, the inventors advantageously recognized that, for the purposes of this invention, this cross-correlation integral may be well approximated by evaluating it at τ=0, which is equivalent to a summation of the signal products $S_iS_j$ over some finite time interval, such as the elements of symmetric correlation matrix $C_T$ as defined in Eqn. 1 (at t=T), which may be more precisely denominated the matrix of the auto- and cross-correlations of the K time-varying sensor signals $\{S_k(t)\}$. It may be readily appreciated by skilled practitioners that the claimed method and system of this invention are not limited to cross-correlations at τ=0, although the exemplary embodiments described herein generally exploit the advantages of this limiting assumption. The sensor signal auto- and cross-correlations are not so limited nor are their applications in accordance with the method of this invention, which includes all embodiments of the cross-correlation element for non-zero values of t that are consistent with the claims.

Similarly, for each new sample, channel sum accumulator 198 adds the current sample of each signal $S_i$ to the existing elements of a channel sum vector $\mu_t$ whose elements represent the first expected values of the signals $E[S_i]$, according to Eqn. 2:

$$\mu_t=[\overline{S_1},\overline{S_2} \ldots \overline{S_K}]. \quad [\text{Eqn. 2}]$$

At the end of the accumulation interval, where t=T, correlation matrix accumulator 196 transfers the digital signals 200 representing the K(K+1)/2 unique elements of the symmetric cross-correlation matrix $C_T$ to the covariance matrix processor 202 in vector evaluator 184. Channel sum accumulator 198 similarly transfers the digital signals 204 representing the K unique elements of the channel sum vector $\mu_T$ to covariance matrix processor 202, which produces data signals representing the covariance matrix $A_T$ that may be more precisely denominated the matrix of the variances and covariances of the K sensor signals $\{S_k(t)\}$ over the accumulation interval T. According to the well-known equivalence for the covariance of two random variables, $$Cov(X,Y) = E\{[X-E(X)][Y-E(Y)]\} = E\{XY\} - E\{X\}E\{Y\}, \quad [\text{Eqn. 3}]$$

so at t=T, covariance matrix $A_T$ may be derived from the symmetric correlation matrix $C_T$ and the channel sum vector $\mu_T$ according to Eqns. 4 and 5:

$$A_T = \begin{pmatrix} (\overline{S_1 S_1} - \overline{S_1} \Box \overline{S_1}) & \cdots & (\overline{S_1 S_K} - \overline{S_1} \Box \overline{S_K}) \\ \vdots & \ddots & \vdots \\ (\overline{S_K S_1} - \overline{S_K} \Box \overline{S_1}) & \cdots & \overline{S_K S_K} - \overline{S_K} \Box \overline{S_K} \end{pmatrix} \quad [\text{Eqn. 4}]$$

$$A_T = \begin{pmatrix} (C_{11} - \mu_1 \mu_1) & \cdots & (C_{1K} - \mu_1 \mu_K) \\ \vdots & \ddots & \vdots \\ (C_{K1} - \mu_K \mu_1) & \cdots & (C_{KK} - \mu_K \mu_K) \end{pmatrix} \quad [\text{Eqn. 5}]$$

where $C_{ij}$ are the elements of $C_T$ from Eqn. 1 and $\mu_n$ are the elements of $\mu_T$ from Eqn. 2 for t=T. Note that this process of obtaining the covariance matrix $A_T$ results in "de-meaning" of the sensor signals and covariance matrix $A_T$ is therefore useful whether or not the time-varying sensor signals $\{S_k(t)\}$ have zero means. This advantage is important for this exemplary embodiment of the blind signal location method of this invention. As used herein, the term "covariance matrix $A_T$" denominates the matrix of the variances and covariances of a plurality K of any time-varying sensor signals $\{S_k(t)\}$ from Eqn. 4 over the interval t=[1, T], and the term "correlation matrix $C_T$" denominates the matrix of the auto-correlations and cross-correlations of a plurality K of any zero-mean time-varying sensor signals $\{S_k(t)\}$ from Eqn. 1 over the interval t=[1, T]. The correlation matrix $C_T$ may also be used to accomplish the method of this invention if a high-pass filter is first used to "de-mean" the sensor signals, as may be appreciated with reference to Eqns. 1–5.

Although this description of matrix accumulator 182 and vector evaluator 184 includes exemplary embodiments that use the matrix of sensor signal variances and covariances $A_T$, the system and method of this invention may also be embodied in a manner that employs a symmetric correlation matrix $C_T$ of K zero-mean time-varying sensor signals $\{S_k(t)\}$, for example. Moreover, should the zero-mean sensor signals $\{S_k(t)\}$ be distorted by the measurement process such that the signal means deviate from zero, the distortion may be removed by demeaning the distorted signals by means of, for example, a high-pass pre-filter. This is disadvantageous for the blind signal detection application of this invention but, when the target signals are well-known, a bandpass or comb pre-filter stage of some type may be advantageously added to the exemplary embodiments discussed herein. For example, when seeking a known signal emission from sonde or a line illuminator, a high-pass pre-filter may be added as demeaning operator on finite length sensor data. Similarly, when seeking a buried permanent magnet (emitting a fixed field) in the presence of power-line interference, a low-pass pre-filter may be added to preserve the resulting non-zero mean sensor signals. However, when an unknown signal is blindly sought, these exemplary embodiments are particularly advantageous for most buried object signal emissions because the sensor signals $\{S_k(t)\}$ need not be presumed zero-mean. Because the sensor signals $\{S_k(t)\}$ usually, but not always, are essentially zero-mean, the covariance matrix $A_T$ (Eqn. 5) implementation, which represents the first non-vanishing statistical moment for zero-mean signals (the second statistical moment) is unexpectedly advantageous.

Recall that covariance matrix $A_T$ represents the variance and covariance statistics of the K sensor signals $\{S_k(t)\}$ over an accumulation interval having a plurality T of τ-second sampling intervals. Upon starting a new accumulation interval at index t=1, which may occur during the present accumulation interval or upon its expiration, for example, accumulator 182 begins to accumulate a new cross-correlation matrix $C_T$ for sensor signals received during the next plurality T of τ-second sampling intervals. According to the method of this invention, the integer number T may vary from one sampling interval to the next. Evaluating the covariance matrix $A_T$ at the end of a predetermined but variable accumulation interval assumes at least a piece-wise stationarity in the sensor signal statistics (stationarity denominates a random process having unchanging statistical properties), but the resulting eigenvalues and eigenvectors need not be either linear or stationary to be useful for detecting the strongest signal component correlated among the sensor plurality without foreknowledge of any signal properties such as precise frequency, modulation or location.

Covariance matrix processor 202 transfers the digital signals 206 representing the K(K+1)/2 unique elements of covariance matrix $A_T$ to the matrix eigenvalue processor 208, which produces the K eigenvalues $\{\lambda_k\}$ and associated eigenvectors $\{V_k\}$ for covariance matrix $A_T$ in any one of the useful fashions known in the mathematical arts.

By way of example, a singular value decomposition (SVD) method for producing these eigenvalues and eigenvectors is now described. Expressing the diagonal matrix as the square of another diagonal matrix has the advantage of making the largest value in $\Sigma$ directly equivalent to the magnitude of the eigenvector. As used herein, the eigenvalue $\lambda_1$, is proportional to the power of the corresponding electromagnetic signal emission and the square root of the eigenvalue $\lambda_1$ is proportional to the amplitude of the corresponding electromagnetic signal emission at the sensor assembly.

As is well-known in the mathematical arts, the SVD represents an expansion of the original sensor signal data in a coordinate system where the symmetric covariance matrix A is also diagonal. Calculating the SVD for any M×N matrix A (M≧N) consists of finding two orthogonal matrices U and V such that $$A = U\Sigma V^T \quad [\text{Eqn. 6}]$$

where U is an M×M orthogonal matrix, V is a N×N orthogonal matrix and $\Sigma$ is an M×N "diagonal" matrix containing the N "singular values" for A ordered from the largest to the smallest value. Because U and V are orthogonal, then of course $UU^T = VV^T = I$, the unit matrix of appropriate rank. As is well known in the mathematical arts, both a cross-correlation matrix C and a covariance matrix A are square, symmetric, and positive semi-definite, and in such a case, U=V. For M=N, when A is a square symmetric matrix, SVD is equivalent to diagonalization, which is simply the solution of the eigenvalue problem, where $\Sigma^T\Sigma=\Lambda$ is a diagonal matrix with entries representing the eigenvalues $\{\lambda_k\}$ of A and the columns of V are the corresponding eigenvectors $V_k$. This may be appreciated from the following relationships:

$$A^T A = V\Sigma^T U^T U\Sigma V^T = V\Sigma^T \Sigma V^T = V\Lambda V^T \quad \text{[Eqn. 7]}$$

The actual implementation of this SVD technique need not use the general SVD approach described above but may instead, for example, use any of the well-known methods exemplified by the SVD methods disclosed at http://www.library.cornell.edu/nr/bookcpdf/c11-2.pdf and http://www.library.cornell.edu/nr/bookcpdf/c11-3.pdf, which may be written in efficient assembly code for the TMS320VC5502 digital signal processor, for example. Reference is also made to, for example, Press et al. [Press et al., "Numerical Recipes in C: The Art of Scientific Computing (Chapter 11)," Cambridge University Press, 2nd edition, Oct. 30, 1992, ISBN: 0521431085] for useful numerical methods implementing the SVD technique.

In FIG. 8, matrix eigenvalue processor 208 produces a digital signal 210 representing the largest eigenvalue $\lambda_1$ and the digital signals 212 representing the plurality K elements of the corresponding eigenvector $V_1$, which are located at the k=1 positions respectively in $\Lambda$ and V because of reordering by scalar value during the SVD. Digital signals 210 and 212 are accepted by the field vector calculator 214 in vector evaluator 184 and used to produce the digital data 216 representing one or more field vectors for processing and display by, for example, GUI display 166 in FIG. 7 or GUI display 124 in FIG. 5.

The PCA method of this invention is particularly useful as a blind signal detection method because matrix accumulator 182 and vector evaluator 184 produce a field vector for at least one electromagnetic signal emission during each accumulation interval, without foreknowledge of the properties of such signal emission. However, the PCA method of this invention is also useful for locating known signals emitted by buried objects, including sondes and the like. Matrix accumulator 182 always produces a maximal eigenvalue and associated eigenvector, which may be processed to produce a field vector for the strongest signal emission in the vicinity, whatever it is. If the locator operator has some foreknowledge of the properties of the signal emission sought, adjustments may be made to increase sensitivity of the locator system of this invention to the signal sought by adjusting parameters of bandpass filter logic 110 (FIG. 5) or adjusting the LO parameters in analog signal conditioning and digitizing assembly 134 (FIG. 6), for example. But it is an important feature and advantage of the system and method of this invention that, within each frequency region established by bandpass filter logic 110, the strongest coherent signal emission in the vicinity, whether active or passive, may always be blindly detected and located.

Pre-Rotation of the Sensor Signals

Another well-known portable locator problem is the convolution of any locator system operator motion with the received emission signal. To permit reasonably optimal filtering, these operator motion effects must be deconvolved before applying any nominal matched filter. Alternatively, the filter structure may be substantially modified to incorporate the motion inputs.

Figure 11:
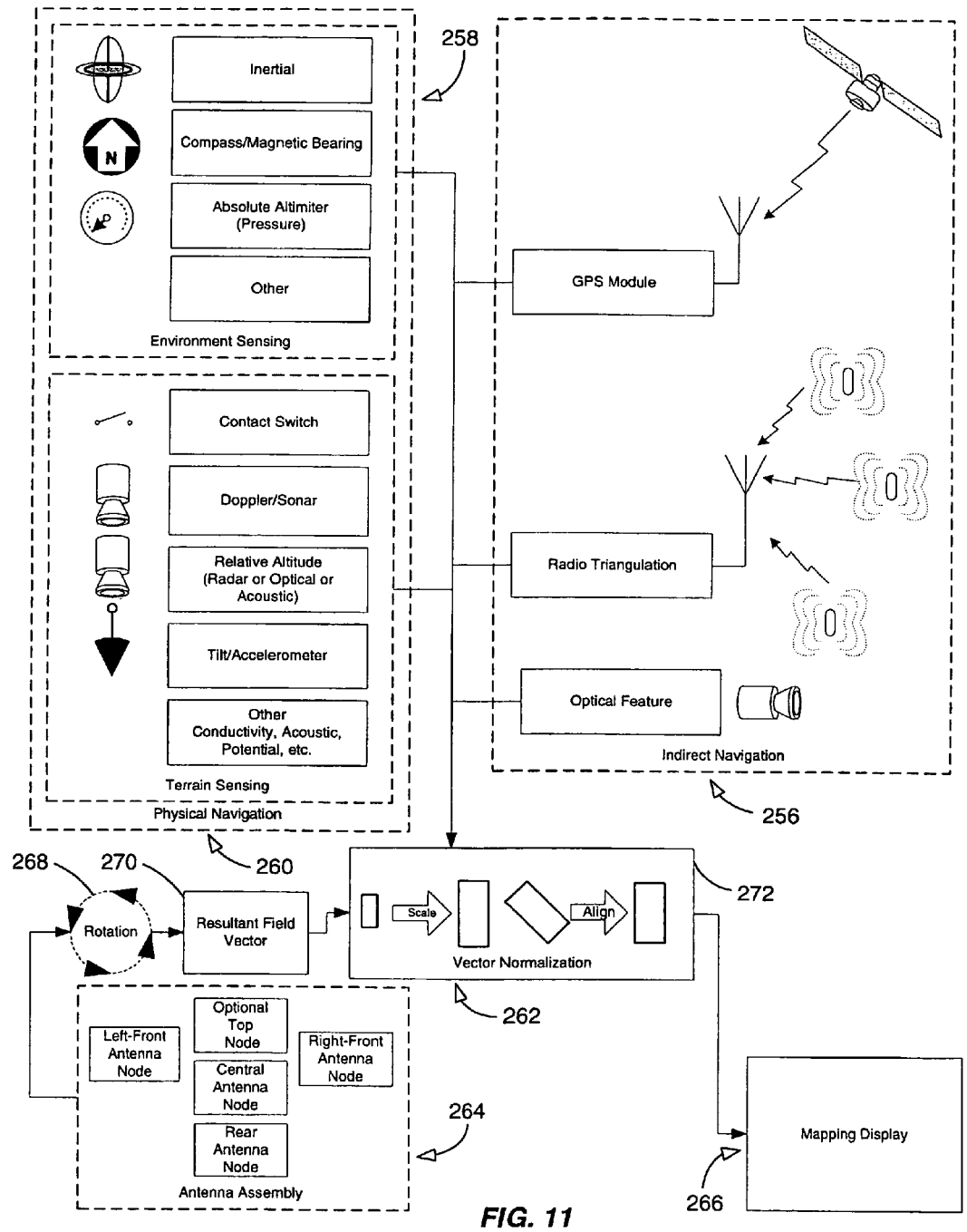
FIG. 11 is a functional block diagram illustrating an exemplary embodiment of the locator system of this invention including a pre-rotation element.

FIG. 11 is functional block diagram illustrating an exemplary embodiment of the locator system of this invention including a pre-rotation element. An indirect navigation module 256, an environmental sensor 258 and a terrain sensing module 260 provide input to a vector normalization module 262. Vector normalization module 262 also receives input from a sensor assembly 264. The locations of underground utilities are indicated on a UI mapping display 266.

The pre-processing element 268 may be used to remove the undesired effects of locator system movement by the operator with respect to the signal emission before determining the field vector at the processor assembly 270. The first order correction is to form a times series of vectors with the outputs available from any single node in the sensor array 264 and to use angle change information from the physical navigation sensor suites 258 and 260 to rotate the time series of vectors into a rotation free frame of reference before those signals are applied to filters (not shown) in processor assembly 270 (e.g., FIGS. 5 and 7).

The characteristics of the filters provided in processor assembly 270 depend on the characteristics of the signal emission sought. Traditional portable locators have used very narrow band filters. The usual operator motion places a limit on the minimum bandwidth in the filters. Rotating the sensor output vector time series allows the use of narrower filters for improved detection range. At large ranges, the signal varies very slowly with changes in range and a narrower filter is more desirable.

In a broadband locator system, very similar issues arise. If the operator's rotational motion is significant on the time scale of the active emission signal code length, the matched filter sees significant decorrelation and a loss of output amplitude occurs. Again, if the signals are rotated to a stationary frame before application to the matched filters, significant improvement in detected signal strength is seen. Preferably, each node in sensor array 264 produces three orthogonal signal components. For each of these nodes, the first step is to rotate the three signal components into components aligned with the system axis used by the navigation sensors 258 and 260. This may be accomplished by any useful method, such as an ordinary matrix multiplication (e.g. Eqns. 8 or 10). The second step in the preferred embodiment is to use roll, pitch and yaw signals for the navigation suites 258 and 260 to form a matrix operator that rotates signals in the portable locator frame of reference into an earth referenced frame. In most applications, the utilities, navigation beacons, and jammers are stationary in the earth-referenced frame. Signals referenced to that frame may be advantageously processed by considerably narrower filters. These matrix multiplications may be performed using fixed-point or floating-point techniques in processor 270 embodied as a GP computer, a DSP, or a custom hardware accelerator, for example. Subsequent filtering and processing for the vector normalization block 272 may be in the same physical processor or in a second DSP, for example.

A second level of correction is also useful. In any particular orientation, some of the sensors in sensor assembly 264 may be closer than others to the buried utilities sought, some closer than others to the navigation beacons, and some closer than others to other interfering emission sources. Any operator motion modulates (is convolved with) the emission signals sought from the utilities and navigation beacons and also modulates any interfering emission sources. This modulation spreads the spectrum of both the sought and interfering signals and makes their separation in the following filters more difficult. The translational and angular information from physical navigation sensor suites 258 and 260 may be used with the known physical configuration of assembly 264 to transform the signal vectors into a quasi-stationary frame before being processed by the matched filters. This procedure minimizes the amount of bandwidth spreading and signal distortion caused by operator motion, thereby better resolving the utility and beacon signals and rejecting the interfering signals.

Figure 12:
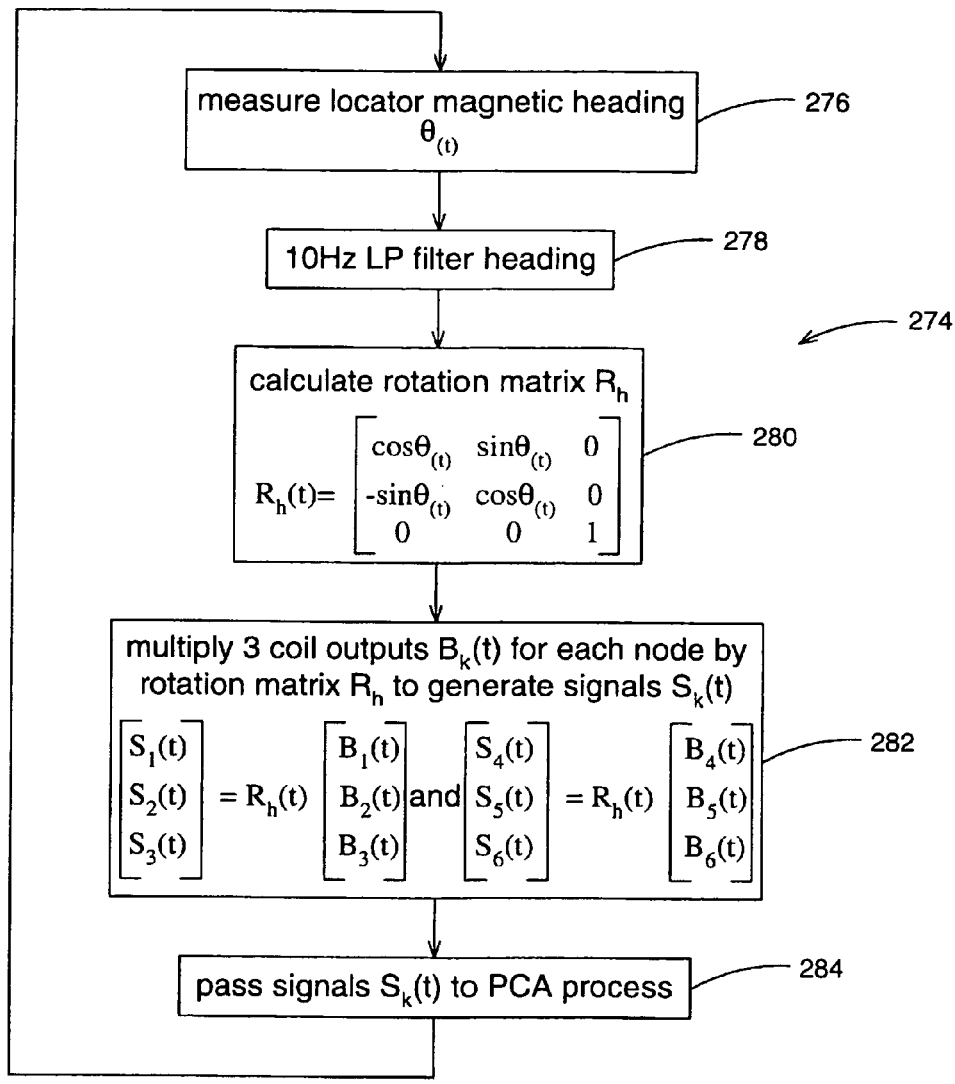
FIG. 12 is a block diagram of a flow chart illustrating an exemplary embodiment of the pre-rotation method of this invention.

FIG. 12 is a block diagram of a flow chart illustrating an exemplary embodiment 274 of the pre-rotation method of this invention. For each of a plurality T of τ-second sampling intervals indexed by t=1, T, the first step 276 produces a signal θ(t) representing the magnetic heading azimuth of the locator system at index t, which includes the effects of operator movement and noise. The locator system includes a local three-dimensional coordinate system having a single zero-heading (azimuthal) axis (not shown) and the signal θ(t) represents the angle between this local azimuthal axis and magnetic north. In the next step 278, this signal θ(t) is digitally low-pass filtered to remove the effects of any frequencies above 10 Hz, which eliminates much of the noise and leaves only the operator motion components of the original signal θ(t). In the third step 280, the corresponding three-dimensional pre-rotation matrix R is computed by calculating the trigonometric functions of the signal θ(t) substantially as shown in FIG. 12. In the step 282, the six sensor coil signal samples $\{B_k(t)\}$ from the two nodes of the sensor assembly are rotated to realign them with the magnetic north at the particular sampling time t for which the sensor signal samples were obtained, thereby producing the pre-rotated sensor signal samples $\{S_k(t)\}$. Finally, in the step 284, these time-varying signal samples $\{S_k(t)\}$ are passed to the PCA process described above in connection with FIGS. 5 and 7, for example.

Figure 13:
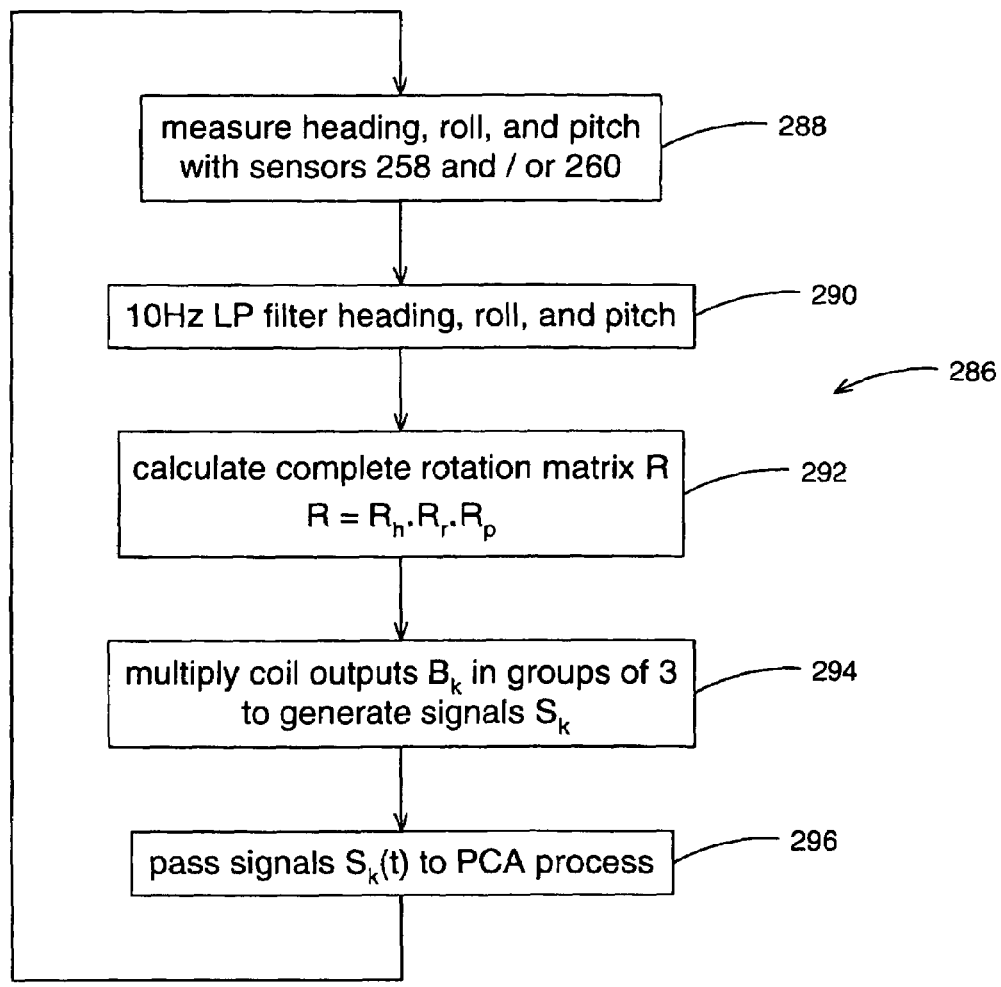
FIG. 13 is a block diagram of a flow chart illustrating an alternative embodiment of the pre-rotation method of this invention.

FIG. 13 is a block diagram of a flow chart illustrating an alternative embodiment 286 of the pre-rotation method of this invention. For each of a plurality T of τ-second sampling intervals indexed by t=1, T, the first step 288 produces a plurality of attitude signals $\{\theta(t), \phi(t), \psi(t)\}$ representing the three-dimensional attitude (heading, azimuth or yaw θ(t), roll φ(t) and pitch ψ(t)) of the locator system with respect to an attitude reference at index t, which includes the effects of operator movement and noise. The locator system includes a local three-dimensional coordinate system and these signals represent its attitude in three-dimensions. In the next step 290, these signals $\{\theta(t), \phi(t), \psi(t)\}$ are each digitally low-pass filtered to remove the effects of any frequencies above 10 Hz, which eliminates much of the noise and leaves only the operator motion components of the original attitude signals $\{\theta(t), \phi(t), \psi(t)\}$. In the third step 292, the corresponding three-dimensional pre-rotation matrix R is computed by calculating the individual rotation matrices (Eqns. 8) from the trigonometric functions of the signals $\{\theta(t), \phi(t), \psi(t)\}$ and multiplying the results substantially as shown in FIG. 13, where, for example, $$R_h(t) = \begin{bmatrix} \cos\theta(t) & 0 & \sin\theta(t) \\ 0 & 1 & 0 \\ -\sin\theta(t) & 0 & \cos\theta(t) \end{bmatrix}$$

$$R_r(t) = \begin{bmatrix} 1 & 0 & 0 \\ 0 & \cos\varphi(t) & -\sin\varphi(t) \\ 0 & \sin\varphi(t) & \cos\varphi(t) \end{bmatrix}$$

$$R_p(t) = \begin{bmatrix} \cos\psi(t) & -\sin\psi(t) & 0 \\ \sin\psi(t) & \cos\psi(t) & 0 \\ 0 & 0 & 1 \end{bmatrix}$$

Eqns. 8

In the step 294, the six sensor coil signal samples $\{B_k(t)\}$ from the two nodes of the sensor assembly are rotated in groups of three to realign them with the attitude reference at the particular sampling time t for which the sensor signal samples were obtained, thereby producing the pre-rotated sensor signal samples $\{S_k(t)\}$. Finally, in the step 296, these pre-rotated time-varying signal samples $\{S_k(t)\}$ are passed to the PCA process described above in connection with FIGS. 5 and 7, for example.

Virtual Sensor Assemblies

The above-described pre-rotation method has other advantages. For example, packaging constraints may dictate that each of several sensor balls be oriented independently from the others. Pre-rotation of the sensor data into a single frame of reference (coordinate system) can significantly simplify subsequent data processing at the expense of some additional front end sensor data rotation calculations. Subsequent processing operations can assume that all of the vector information is in the same coordinate system and the subsequent algorithms can remain general in design and organizational structure. In this manner "virtual" sensors aligned with each coordinate axis of the coordinate system of the instrument may be formed by organizing the sensor signals $\{S_k(t)\}$ sample data into correlation "groups" representing "virtual sensor assemblies" composed of data from selected sensors and excluding data other sensors.

For example, consider a sensor assembly having four nodes of three orthogonal sensors, for a total of 12 sensor coils. The method of this invention for processing all twelve signals requires a twelve by twelve correlation process, which is very expensive computationally, and perhaps feasible only by using disadvantageously expensive processing components. It is "cheaper" to independently process each node as a group of three, and the four resulting three by three correlations may then be somehow correlated among themselves so that their relative signal strengths are comparable.

As a virtual sensor assembly example, for a tetrahedral, four sensor node, twelve-coil sensor assembly, each sensor node may be processed as a virtual correlation group of three collocated sensors. When the sensor orientation in one node is not aligned with that for the other nodes in the sensor assembly, then the pre-rotation technique of this invention may be employed to form an virtual array of aligned sensors by pre-rotating the misaligned sensor data before the correlation analysis in processor 270, for example.

An additional virtual sensor correlation group of four sensors may then be formed from the signals of a corresponding sensor from each of the four nodes. The relative magnitude of the signals from each of these sensors so determined may then be used to normalize the separately determined results for each three-element node so that the signal strength magnitudes are comparable across all of the sensors without requiring a complete twelve-sensor correlation operation. This alternative method of this invention is very advantageous when forming a true gradient vector from the emission field vectors detected at all four sensor nodes.

A further alternative is to form the virtual inter-node group of four sensors from the individual sensors most closely aligned with the field vector component determined from the analysis thereby optimizing the signal-to-noise ratio (SNR) for normalizing the relative signal magnitudes of the four nodes.

Determining the Field and Location Vectors

The basic geometric concepts underlying the calculation of field vectors by field vector calculator 214 in vector evaluator 184 is now described in terms of an example employing magnetic sensing coils and a B-field vector but it may be readily appreciated that the system of this invention may also be applied analogously to the determination of an electric E field vector using electric field sensors, for example. FIGS. 9A–D are schematic diagrams illustrating the geometric relationships of the field vectors at the sensor assembly embodiment of FIG. 2 for the electromagnetic signal emission from a buried object that creates a field B at the sensors, which corresponds to first eigenvalue data signal 210 and associated eigenvector component data signal 212 (FIG. 8). Recall that the $k^{th}$ eigenvector component $V_k$ represents the relative value of the component of signal emission field B captured by the $k^{th}$ sensor in, say, sensor assembly 126 (FIG. 6). In a preferred embodiment, these sensors are disposed in one or more arrays of three orthogonal coils (e.g. lower sensor array 40 in FIG. 3 or lower sensor array 130 in FIG. 6) so that each of the three coils detects an independently oriented component of signal emission field B. Such a use of three sensors represents a minimal solution for measuring the magnitude and direction at a single point (at the sensor array) of the magnetic field B emanating from the buried object. But there is no requirement that the sensors be mutually orthogonal. Mathematically, the sensors only need to be linearly independent. That is, the sensors need to span the vector space of interest.

By way of example, an embodiment of the system of this invention may incorporate a single array of four or more non-coplanar and non-coaxial sensor coils (not shown) such as is described in one or more of the above-recited patent applications incorporated herein by reference. In vector notation, three orthogonal sensors represent the particularly simple (x, y, z) basis set {(1,0,0), (0,1,0), (0,0,1)}. An example of a non-orthogonal (x, y, z) basis set is {(1,0,0), (1,1,0), (1,1,1)}. Such a non-orthogonal (x, y, z) basis set might be useful to satisfy some packaging constraint, for example, and the equivalent orthogonal components may be derived therefrom using well-known coordinate manipulation techniques. Thus, a practitioner skilled in the art can readily appreciate that (x, y, z) sensor orthogonality is not essential and may be relaxed to meet physical limitations on the configuration of the locator. The SVD method of this invention also reduces the signals from a group of non-orthogonal senors to the equivalent mutually-orthogonal components of the signal emission B magnetic field.

Using four or more sensors allows measurement of local gradients in the signal emission field. To do this properly may require eight sensor coils, for example. This is best illustrated by considering sensor assembly 34 (FIG. 2), which uses a total of six coils disposed in two arrays of three coils each. Should more information be desirable, namely, whether the vertical signal emission field gradient increases to the left or to the front, three additional coils may be added to the front and three additional coils added to the right; for example, for a total of twelve coils resulting in an over-determined system. Such an over-determined system can be solved to yield nine components:

$$\frac{\partial B_x}{\partial x} \quad \frac{\partial B_y}{\partial x} \quad \frac{\partial B_z}{\partial x}$$
$$\frac{\partial B_x}{\partial y} \quad \frac{\partial B_y}{\partial y} \quad \frac{\partial B_z}{\partial y}$$
$$\frac{\partial B_x}{\partial z} \quad \frac{\partial B_y}{\partial z} \quad \frac{\partial B_z}{\partial z}$$

[Eqns. 9]

These nine components are not linearly independent because Maxwell's equations require that the magnetic field has no divergence ($\nabla \cdot B = 0$). There are only eight independent magnetic field B components and therefore eight sensor coils are necessary and sufficient to fully resolve the local curvature and magnitude of the magnetic field B. Again, the positions and orientations of these sensor coils need not be disposed on a rectilinear set of axes but may be disposed on the surface of a sphere, for example. The signals from more than eight sensor coils may also be reduced to the minimal set of eight components in a least squares sense.

The system of this invention may be better appreciated with reference to the relationships among three different signal emission vectors of interest; the field vector, the gradient vector and the location vector, which are now briefly described. In some embodiments of the system of this invention, the field vectors may be employed to determine an associated field gradient vector and perhaps an estimated location vector for the buried object by any of the several useful mathematical and operational methods known in the art, which may be appreciated with reference to, for example, the above-recited patent applications incorporated herein by reference. The field vector and gradient vectors may be resolved by the machine-implemented method and system of this invention but the location vector is more problematic and may require certain operational methods known in the art, which may be performed by the locator system operator. For example, the azimuth and elevation angles of the field vector may be measured at each three-coil array node in the sensor assembly. The gradient vector may then be estimated between any two points for which the field vector is known and, with three known field vector components available at each point, the true gradient vector may be calculated, which is very useful in locating the corresponding buried object. However, a true location vector identifying the buried object location in three dimensions relative to the sensor assembly location is not readily available from the field vector or gradient vector alone.

To overcome these limitations, the locator system operator may adopt one or more of several useful strategies, for example, the operator may interact with the system GUI display to center a line or maximize signal strength and thereby locate the buried object in three dimensions by an accumulation of inferences. If the signal emission field type and geometry is nearly ideal and known a priori, a useful location vector may be determined by calculations involving the field and gradient vectors. Useful methods for accomplishing this are well-known for two-dimensional cylindrical fields from long buried conductors, for example, as is described in one or more of the above-recited patent applications incorporated herein by reference. The field vector may be determined by resolving the components of three collocated sensors (preferably orthogonal), which includes a field magnitude and direction (azimuth and elevation, for example) along the local field line as measured. Should it be known that the field is a simple, infinite (or very long), straight cylindrical electromagnetic field, a horizontal field vector indicates that the sensor assembly is directly above (or below) the associated buried object and a sloped field vector indicates a sensor assembly position to one side or the other depending on how the field is sloped.

Should it be known that the field is a dipole (sonde) pattern, additional information is required to determine the buried object location according to well-known operational techniques. Using a sensor assembly such as sensor assembly 34 shown in FIG. 2 with lower and upper sensor balls 26 and 28, the gradient vector may be resolved over the conjoining axis along elongate member 24. When assembly 34 is positioned directly above a buried line and the axis between sensor balls 26 and 28 is disposed vertically, the gradient vector is disposed straight down and (assuming a 1/R first-power radius magnitude relationship) the field gradient magnitude is related to the depth of the buried line. In this exemplary geometric special case, the gradient vector may be resolved.

Using a sensor assembly having four such three-coil sensor balls, the full gradient vector may be resolved without recourse to such special geometric cases, as may be appreciated with reference to the above discussion in connection with Eqns. 9. One preferred example of a useful four-ball sensor assembly geometry is the four corners of a tetrahedron. Fully resolved gradient vectors are preferred but a dipole (sonde) emitter creates a field where the field strength varies from 200% to 100% from the main dipole axis to the 90-degree point (for constant radius). Because of this characteristic of a dipole, even the gradient vector will not point directly at the center of the dipole. In some special situations, such as when the emission field is a simple and undistorted product of either a dipole or a cylindrical line, for example, an estimate of the true location vector may be calculated by extrapolating the buried emitter location from the known gradient vector and the theoretical field geometry. For example, the field vectors obtained by the system of this invention at each of four three-coil sensor nodes may be tested mathematically for conformance to a true dipole field of a specific orientation or a perfect cylindrical field to produce a figure of merit representing the best fit of the measured field vectors to either a pure dipole or a pure cylinder or some combination thereof. In the case of an unknown combination of dipole and cylindrical fields, however, such a location vector solution may be indeterminate.

In practice, the system of this invention may determine the azimuth and elevation angles of a field vector at a sensor assembly after the orthogonal transformation of the maximal eigenvector $V_1$, with respect to a sensor assembly coordinate system. For example, let $\{V_1, V_2, V_3\}$ represent the first three eigenvector components of $V_1$ found for sensor array 126 in FIG. 6 and thus the signal emission components detected by the three mutually-orthogonal coils of lower sensor array 130, then:

$$V_x = V_1 \times \left(\sqrt{\frac{2}{3}}\right) + V_2 \times 0 + V_3 \times \left(\sqrt{\frac{1}{3}}\right)$$

$$V_y = V_1 \times \left(-\sqrt{\frac{1}{6}}\right) + V_2 \times \left(\sqrt{\frac{1}{2}}\right) + V_3 \times \left(\sqrt{\frac{1}{3}}\right)$$

$$V_z = V_1 \times \left(-\sqrt{\frac{1}{6}}\right) + V_2 \times \left(-\sqrt{\frac{1}{2}}\right) + V_3 \times \left(\sqrt{\frac{1}{3}}\right)$$

[Eqns. 10]

where the signs are reversed for $\{V_x, V_y, V_z\}$ if and only if $V_z<0$. After this transformation, field vector azimuth and elevation angles may be determined in terms of a sensor assembly coordinate system as follows. This procedure is reminiscent of the above discussion in connection with Eqns. 8.

Figure 9A:
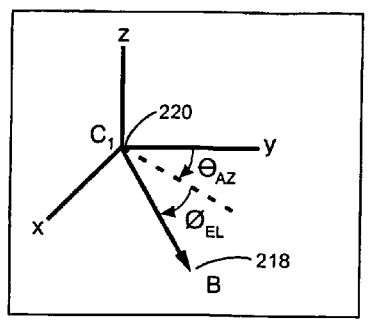
FIGS. 9A–D are schematic diagrams illustrating the geometric relationships of the field and location vectors between the sensor assembly embodiment of FIG. 2 and a buried object.
Figure 9B:
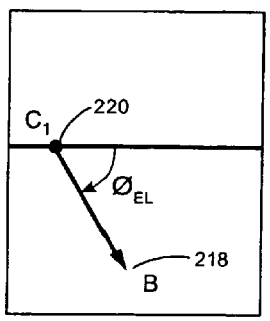
Figure 9C:
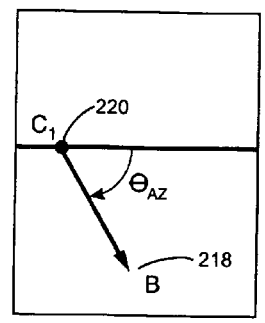

FIGS. 9A–D are vector diagrams illustrating an example where the electromagnetic signal emission from a buried object creates a magnetic field B 218 at a sensor assembly having a single sensor array 220. The sensor array signals are processed to yield the eigenvector components $\{V_x, V_y, V_z\}$ according to the method of this invention. FIG. 9A illustrates a perspective view of the field vector example. FIG. 9B illustrates a side (elevation) view of the same example. FIG. 9C illustrates a top (plan) view of the same example. The field vector 218 at sensor assembly 220 may be computed using simple trigonometric formulas. For example, an azimuth angle $\theta_{AZ}=\text{Arctan}(V_y/V_x)$ is easily computed from two transformed eigenvector elements and an elevation angle $\phi_{EL}=\text{Arctan}((V_z/(V^2_x+V^2_y)^{1/2})$ is available from three transformed eigenvector elements. These field vector examples use spherical coordinates for expository purposes only. As used herein, the term "field vector" denominates a relative measure of the local electromagnetic signal emission field that may be expressed in any useful coordinate system without limitation, regardless of the symbols used herein to exemplify or denominate a field vector. Knowing the field vector azimuth and elevation angles, an estimate of the true location vector may be calculated according to the method of this invention by extrapolating the buried emitter location from the known gradient vector and the theoretical field geometry (not shown), for example.

Figure 9D:
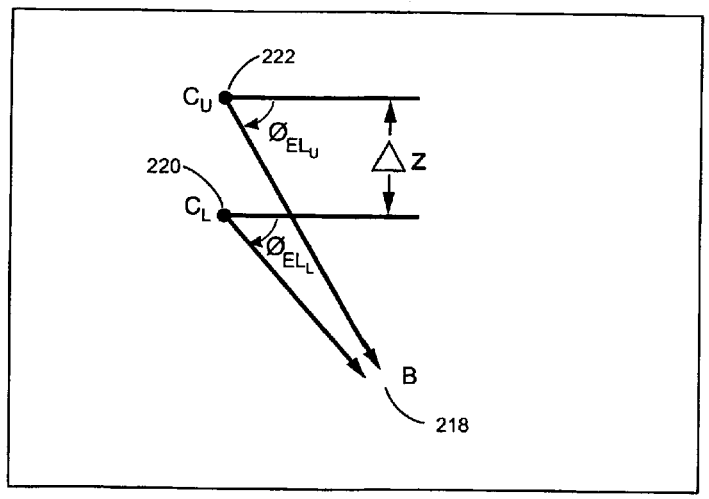

FIG. 9D illustrates a side (elevation) view of another example where the signal emission from a buried object creates a magnetic field B at a sensor assembly having lower sensor array 220 and another upper sensor array 222. The six resulting sensor signals are processed to yield the eigenvector components $\{V_{Lx}, V_{Ly}, V_{Lz}, V_{Ux}, V_{Uy}, V_{Uz}\}$ according to the method of this invention. Eigenvector components $\{V_{Lx}, V_{Ly}, V_{Lz}\}$ may represent the first three of the six elements of $V_1$ found for sensor array 104 in FIG. 5 and thus the signal emission components detected by the three mutually-orthogonal coils of lower sensor array 40 (FIG. 3), and components $\{V_{Ux}, V_{Uy}, V_{Uz}\}$ may represent the second three of the six elements of $V_1$ found for sensor array 104 and thus the signal emission components detected by three mutually-orthogonal coils of an upper sensor array on elongate member 24, for example. The calculation of two independent field vectors according to the method of this invention may be readily appreciated with reference to the above discussion. For example, an upper field vector azimuth angle $\theta_{UAZ}=\text{Arctan}(V_{Uy}/V_{Ux})$ is easily computed from two(transformed) eigenvector elements and an upper field vector elevation angle $\phi_{UEL}=\text{Arctan}((V_z/(V^2_x+V^2_y)^{1/2})$ may also be computed. Similar lower field vector azimuth and elevation angles may be obtained. A gradient vector may also be calculated from the two field vectors at the two sensor balls and employed to estimate a true location vector in the manner that may be appreciated with reference to the above discussion.

Figure 10:
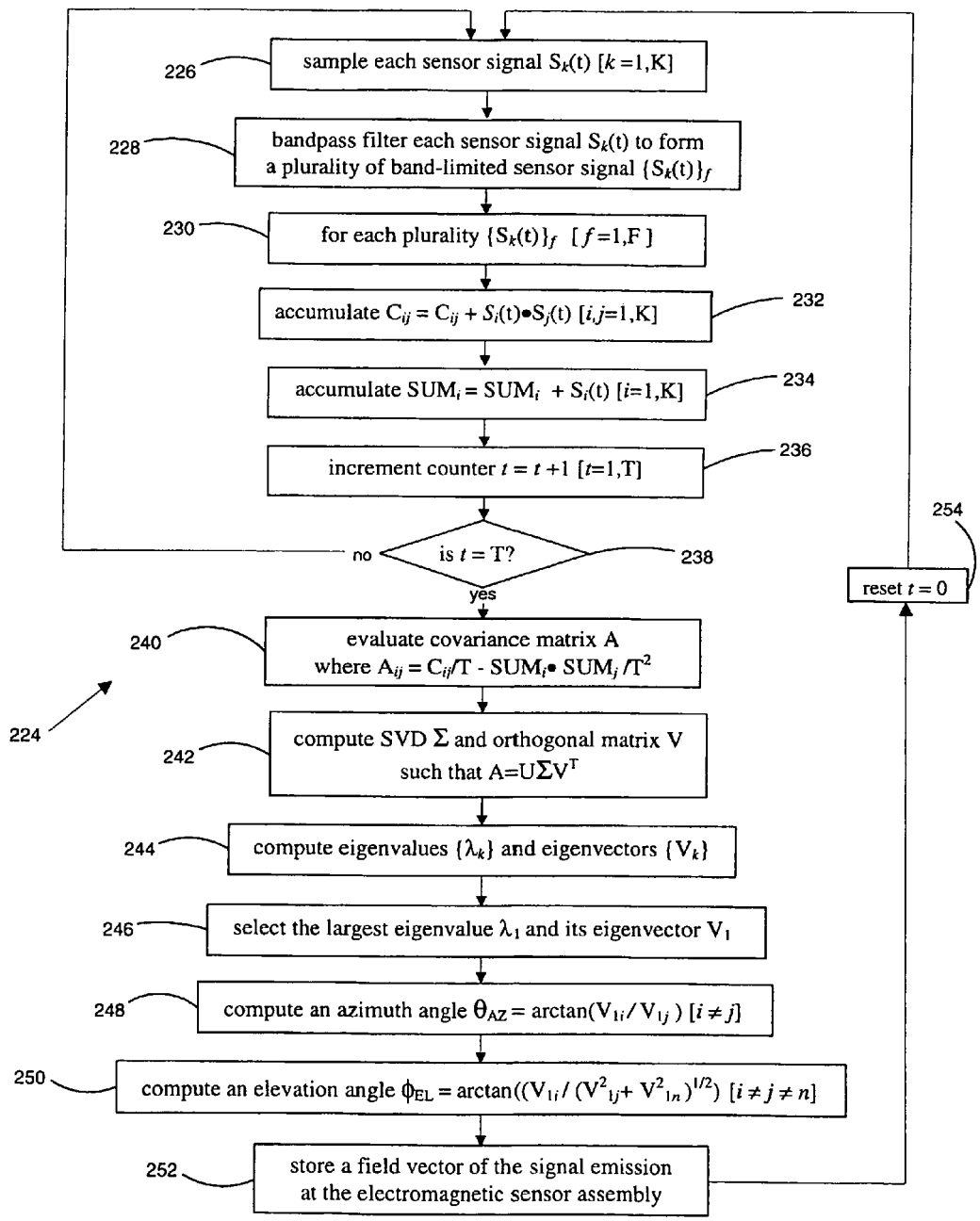
FIG. 10 is a block diagram of a flow chart illustrating an exemplary embodiment of the method of this invention.

FIG. 10 is a block diagram of a flow chart illustrating an exemplary embodiment 224 of the method of this invention. Method 224 begins at the step 226 where each of K sensor signals $S_k(t)$ (k=1, K) is sampled to produce a digital representation of signal amplitude. In the next step 228 of this example, each sample stream is filtered through a plurality F of bandpass filters to form a plurality F sets of K band-limited sensor signal $\{S_k(t)\}_f$ whereby a plurality E of buried objects characterized by signal emissions that differ from one another in frequency may be simultaneously located by the parallel processing of each of the plurality F band-limited sensor signals $\{S_k(t)\}_f$ to obtain the associated field vectors as follows. Beginning at the step 230, for each plurality $\{S_k(t)\}_f$ (f=1, F), first update the accumulated expected values of the signal products $C_{ij}=C_{ij}+S_i(t) \cdot S_j(t)$ (i,j=1, K) in the step 232 and the accumulated expected values of the signals $SUM_i=SUM_i+S_i(t)$ (i=1, K) in the step 234 and then increment the sampling interval index t at the step 236. In the next step 238, index t is tested to determine whether the accumulation interval is complete (either by testing t against a fixed number of T samples or alternatively by testing for an incoming interrupt from elsewhere in the system, for example); if not, the process returns to step 226 and repeats for the next sampling interval. If the accumulation interval is expired, then the process branches to the step 240 and evaluates covariance matrix $A_T$ from the accumulated expected values from steps 232–234, where $A^{ij}=C_{ij}/T-SUM_i \cdot SUM_j/T^2$ for example. In the following steps 242 and 244, the eigenvalues $\{\lambda_k\}$ and eigenvectors $\{V_k\}$ of the sensor signal covariance matrix $A_T$ are obtained, where in this example, the step 242 first obtains a SVD of matrix $A_T$. In the next step 246, the first and largest eigenvalue $\lambda_1$ and its eigenvector $V_1$ are produced for use in the following steps 248 and 250 where the components of a field vector for this particular ($f^{th}$) signal emission are calculated for storage and/or display at the final step 252. Although steps 248–250 illustrate a field vector expressed in spherical coordinates, as used herein, the term "field vector" denominates a relative measure of the local electromagnetic signal emission field that may be expressed in any useful coordinate system without limitation, regardless of the symbols used herein. After completion of step 252, the process resets the sampling interval index t at the step 254 and returns to step 226.

An advantage of the method of this invention is the resulting capability for capturing the net energy from all power line harmonics during passive location of power lines. Without this invention, the typical power line locator employed narrow-band 540 Hz (or 450 Hz) filters to isolate the ninth harmonic of the underlying 60 Hz (50 Hz) power line frequency. While often useful, this filtering technique discards the power contributed by the other power line harmonics, and the ninth harmonic power may not be sufficient for useful SNR. Using the method of this invention, the power line harmonic energy may be captured wherever it happens to be over a much wider frequency band. One useful technique for implementing the method of this invention for passive power line location is to sample at about 8 kHz and use the ADC Nyquist anti-aliasing filters (when available in the ADC chip embodiment employed for ADC assembly 152, for example) to eliminate frequencies above about 4 kHz. High and low pass filters may also be useful for other frequency bands used in active location.

The blind detection of any signal being transmitted within the sensor frequency response region is an important advantage of the system of this invention. Because higher frequencies tend to better couple into unknown buried conductors but lower frequencies travel much farther, the locator system operator may use the broadband receiving capability of the locator system of this invention to advantage to resolve even narrow band, actively transmitted signals. When using the conventional active locating systems known in the art, the transmitter must be set to one frequency at a time and the search area repeatedly traversed with the locator also set to the same one frequency at a time. Some locators were designed with means for remotely changing the transmitter frequency with a radio control link (e.g., U.S. Pat. No. 6,356,082) to address this disadvantage. Using the system of this invention, a transmitter may, for example, transmit simultaneously at 512 Hz, 8 kHz and 33 kHz so that at ranges close to the transmitter, any conductors coupling with the 33 kHz can be detected. As the locator system operator moves farther and farther away from the transmitter, the lower frequencies gradually dominate the higher frequencies and may then be detected without operator adjustment.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. An apparatus for locating one or more buried objects each characterized by an electromagnetic signal emission, the apparatus comprising:
   a sensor assembly including a plurality K of sensors each having a sensor axis and producing a time-varying sensor signal $S_k(t)$, wherein $1 \leq k \leq K$;
   a processor coupled to the sensor assembly for processing a plurality K of the time-varying sensor signals $\{S_k(t)\}$ representing a first electromagnetic signal emission, including
      a matrix accumulator for producing a data signal representing a K by K covariance matrix $A_T$ corresponding to the covariances of the time-varying sensor signals $\{S_k(t)\}$ over a selected time interval, wherein covariance matrix $A_T$ is characterized by a plurality K of eigenvalues $\{\lambda_k\}$ and associated eigenvectors $\{V_k\}$ and
      calculating means for producing a data signal representing a field vector of the first electromagnetic signal emission at the sensor assembly, wherein the field vector corresponds to the eigenvector $V_1$ associated with the largest $\lambda_1$ of the eigenvalues $\{\lambda_k\}$; and
   a user interface (UI) coupled to the processing circuit for indicating the first electromagnetic signal emission field vector at the sensor assembly.

2. The apparatus of claim 1 further comprising:
   a bandpass filter circuit coupled between the sensor assembly and the processor for blocking the portions of the time-varying sensor signals $\{S_k(t)\}$ outside of a predetermined frequency region and passing a plurality K of band-limited sensor signals $\{S'_k(t)\}$ to the processor.

3. The apparatus of claim 2 further comprising:
   a plurality F of the bandpass filter circuits each coupled between the sensor assembly and the processor for producing a plurality K of band-limited sensor signals $\{S'_k(t)\}_f$ for each of a plurality F of predetermined frequency regions; and
   a plurality of the processors each for processing an $f^{th}$ plurality K of band-limited sensor signals $\{S'_k(t)\}_f$ representing one of a plurality E of the electromagnetic signal emissions, wherein $1 \leq f \leq F$,
   thereby simultaneously producing data signals representing field vectors of the plurality E of electromagnetic signal emissions characterizing a plurality of buried objects.

4. The apparatus of claim 3 with the sensor assembly further comprising:
   a first sensor array including three sensors whose sensor axes are disposed to substantially intersect a first array center point orthogonally to one another;
   a second sensor array including one or more sensors whose sensor axes are disposed to substantially intersect a second array center point; and
   an elongate member extending through the first and second array center points and supporting the first and second sensor arrays in a fixed spatial relationship.

5. The apparatus of claim 3 with the bandpass filter circuit includes at least one filter circuit selected from a group comprising:

an Infinite Impulse Response (IIR) filter circuit;
a Fast-Fourier-Transform (FFT) filter circuit; and
an Finite Impulse Response (FIR) filter circuit.

6. The apparatus of claim 3 with the UI further comprising:
    means for simultaneously indicating a plurality E of electromagnetic signal emission field vectors at the sensor assembly.

7. The apparatus of claim 1 further comprising:
    a high-pass filter coupled to the sensor assembly for producing a plurality K of de-meaned time-varying sensor signals $\{S''_k(t)\}$ representing the first electromagnetic signal emission; and
    in the processor, a second matrix accumulator coupled to the high pass filter for producing a data signal representing a K by K correlation matrix $C_T$ corresponding to the correlations of the de-meaned time-varying sensor signals $\{S''_k(t)\}$ over a selected time interval, wherein correlation matrix $C_T$ is characterized by the plurality K of eigenvalues $\{\lambda_k\}$ and associated eigenvectors $\{V_k\}$.

8. The apparatus of claim 1 further comprising:
    a pre-rotation processor in the sensor assembly for processing a plurality K of first time-varying sensor signals each aligned with the corresponding sensor axis, including
        means for producing a data signal representing the sensor assembly attitude with respect to at least one dimension of a predetermined coordinate system, and
        means for producing a data signal representing the plurality K of time-varying sensor signals $\{S_k(t)\}$ corresponding to the plurality K of first time-varying sensor signals rotated with respect to the sensor assembly into alignment with the predetermined coordinate system.

9. The apparatus of claim 1 further comprising:
    in the processor, a virtual subgroup processor for selecting a plurality J of the K sensors to form a plurality G first subgroups each providing a plurality $J_g<K$ of the sensor signals $\{S_j(t)\}_g$, where $1 \leq g \leq G$, including
        means for processing one or more of the plurality G first subgroups to obtain a data signal representing a field vector of the first electromagnetic signal emission at each of the processed first subgroups; and
        means for processing a second subgroup formed by at least one sensor from each of the first subgroups to normalize the field vectors across all of the processed subgroups.

10. The apparatus of claim 1 with the calculating means further comprising:
    means for producing a data signal representing an azimuth angle $\theta_{AZ}$ of the electromagnetic signal emission field vector at the sensor assembly.

11. The apparatus of claim 1 with the calculating means further comprising:
    means for producing a data signal representing an elevation angle $\phi_{EL}$ of the electromagnetic signal emission field vector at the sensor assembly.

12. The apparatus of claim 1 with the UI further comprising:
    means for simultaneously indicating a plurality E of electromagnetic signal emission field vectors at the sensor assembly.

13. The apparatus of claim 1 with the sensor assembly further comprising:
    a first sensor array including three sensors whose sensor axes are disposed to substantially intersect a first array center point orthogonally to one another;
    a second sensor array including one or more sensors whose sensor axes are disposed to substantially intersect a second array center point; and
    an elongate member extending through the first and second array center points and supporting the first and second sensor arrays in a fixed spatial relationship.

14. A machine-implemented method for locating an electromagnetic signal emission with respect to a plurality K of electromagnetic sensors each producing a time-varying sensor signal $S_k(t)$, wherein $1 \leq k \leq K$, the method comprising the steps of:
    (a) producing a data signal representing a K by K covariance matrix $A_T$ corresponding to the covariances of the plurality K of time-varying sensor signals $\{S_k(t)\}$ over a selected time interval, wherein covariance matrix $A_T$ is characterized by a plurality K of eigenvalues $\{\lambda_k\}$ and associated eigenvectors $\{V_k\}$; and
    (b) producing a data signal representing a field vector of the electromagnetic signal emission at the electromagnetic sensor plurality, from which the electromagnetic signal emission location may be inferred, wherein the field vector corresponds to the eigenvector $V_1$ associated with the largest $\lambda_1$ of the eigenvalues $\{\lambda_k\}$.

15. The method of claim 14 further comprising the steps of:
    (a.1) producing a data signal representing a diagonal singular value decomposition matrix $\Sigma$ of the covariance matrix $A_T$ such that $A_T = U\Sigma V^T$ and U and V are orthogonal matrices;
    (a.2) producing a data signal representing the plurality K of eigenvalues $\{\lambda_k\}$ and associated eigenvectors $\{V_k\}$ corresponding to the diagonal singular value decomposition matrix $\Sigma$.

16. The method of claim 15 further comprising the steps of:
    (b.1) producing a data signal representing an azimuth angle $\theta_{AZ}$ of the electromagnetic signal emission field vector at the electromagnetic sensor plurality.

17. The method of claim 16 further comprising the steps of:
    (b.1) producing a data signal representing an elevation angle $\phi_{EL}$ of the electromagnetic signal emission field vector at the electromagnetic sensor plurality.

18. The method of claim 14 wherein a plurality J of the K sensors are selected to form a plurality G of first subgroups each providing a plurality $J_g<K$ of the sensor signals $\{S_j(t)\}_g$, where $1 \leq g \leq G$, further comprising the steps of:
    (c.1) performing steps (a) and (b) to process one or more of the plurality G of first subgroups to obtain a data signal representing a field vector of the electromagnetic signal emission at each of the processed first subgroups; and
    (c.2) performing steps (a) and (b) to process a second subgroup formed by at least one sensor from each of the first subgroups to normalize the field vectors across all of the processed subgroups.

19. The method of claim 14 further comprising the steps of:
    (b.1) producing a data signal representing an azimuth angle $\theta_{AZ}$ of the electromagnetic signal emission field vector at the electromagnetic sensor plurality.

20. A machine-implemented method for simultaneously locating a plurality E of uncorrelated electromagnetic signal emissions with respect to a plurality K of electromagnetic sensors each producing a time-varying sensor signal $S_k(t)$, wherein $1 \leq k \leq K$, the method comprising the steps of:
(a) filtering the plurality K of time-varying sensor signals $\{S_k(t)\}$ to obtain a plurality K of band-limited sensor signals $\{S'_k(t)\}_f$ for each of a plurality F of predetermined frequency regions; wherein $1 \leq f \leq F$; and
(b) processing each of the plurality F of band-limited sensor signal pluralities $\{S'_k(t)\}_f$ by performing the steps of
(b.1) producing a data signal representing a K by K covariance matrix $A_{Tf}$ corresponding to the covariances of the $f^{th}$ plurality K of time-varying sensor signals $\{S_k(t)\}_f$ over a selected time interval, wherein covariance matrix $A_{Tf}$ is characterized by a plurality K of eigenvalues $\{\lambda_k\}_f$ and associated eigenvectors $\{V_k\}_f$ and
(b.2) producing a data signal representing a field vector of the $f^{th}$ electromagnetic signal emission at the electromagnetic sensor plurality, from which at least one uncorrelated electromagnetic signal emission location may be inferred, wherein the field vector corresponds to the eigenvector $V_{1f}$ associated with the largest $\lambda_{1f}$ of the eigenvalues $\{\lambda_k\}_f$.

21. The method of claim 20 further comprising the steps of:
(b.1.1) producing a data signal representing a diagonal singular value decomposition matrix $\Sigma_f$ of the $f^{th}$ covariance matrix $A_{Tf}$ such that $A_{Tf} = U_f \Sigma_f V_f^T$ and $U_f$ and $V_f$ are orthogonal matrices;
(b.1.2) producing a data signal representing the plurality K of eigenvalues $\{\lambda_k\}_f$ and associated eigenvectors $\{V_k\}_f$ corresponding to the diagonal singular value decomposition matrix $\Sigma_f$.

22. The method of claim 21 further comprising the steps of:
(b.2.1) producing a data signal representing an azimuth angle $\theta_{AZ}$ of the electromagnetic signal emission field vector at the electromagnetic sensor plurality.

23. The method of claim 21 further comprising the steps of:
(b.2.1) producing a data signal representing an elevation angle $\phi_{EL}$ of the electromagnetic signal emission field vector at the electromagnetic sensor plurality.

24. The method of claim 20 wherein a plurality J of the K sensors are selected to form a plurality G first subgroups each providing a plurality $J_g < K$ of sensor signals $\{S_j(t)\}_g$, where $1 \leq g \leq G$, further comprising the steps of:
(c.1) performing steps (a) and (b) to process one or more of the plurality G first subgroups to obtain a data signal representing a field vector of the electromagnetic signal emission at each of the processed first subgroups; and
(c.2) performing steps (a) and (b) to process a second subgroup formed by at least one member from each of the first subgroups to normalize the field vectors across all of the processed subgroups.

25. The method of claim 20 further comprising the steps of:
(b.2.1) producing a data signal representing an azimuth angle $\theta_{AZ}$ of the electromagnetic signal emission field vector at the electromagnetic sensor plurality.

26. A machine-implemented method for locating an electromagnetic signal emission with respect to a plurality K of electromagnetic sensors each producing a de-meaned time-varying sensor signal $S_k(t)$, wherein $1 \leq k \leq K$, the method comprising the steps of:
(a) producing a data signal representing a K by K correlation matrix $C_T$ corresponding to the correlations of the plurality K of de-meaned time-varying sensor signals $\{S_k(t)\}$ over a selected time interval, wherein correlation matrix $C_T$ is characterized by a plurality K of eigenvalues $\{\lambda_k\}$ and associated eigenvectors $\{V_k\}$; and
(b) producing a data signal representing a field vector of the electromagnetic signal emission at the electromagnetic sensor plurality from which the electromagnetic signal emission location may be inferred, wherein the field vector corresponds to the eigenvector $V_1$ associated with the largest $\lambda_1$ of the eigenvalues $\{\lambda_k\}$.

27. The method of claim 26 further comprising the steps of:
(a.1) producing a data signal representing a diagonal singular value decomposition matrix $\Sigma$ of the correlation matrix $C_T$ such that $A_T = U \Sigma V^T$ and U and V are orthogonal matrices;
(a.2) producing a data signal representing the plurality K of eigenvalues $\{\lambda_k\}$ and associated eigenvectors $\{V_k\}$ corresponding to the diagonal singular value decomposition matrix $\Sigma$.

28. The method of claim 27 further comprising the steps of:
(b.1) producing a data signal representing an azimuth angle $\theta_{AZ}$ of the electromagnetic signal emission field vector at the electromagnetic sensor plurality.

29. The method of claim 28 further comprising the steps of:
(b.1) producing a data signal representing an elevation angle $\phi_{EL}$ of the electromagnetic signal emission field vector at the electromagnetic sensor plurality.

30. The method of claim 26 wherein a plurality J of the K sensors are selected to form a plurality G of first subgroups each providing a plurality $J_g < K$ of the sensor signals $\{S_j(t)\}_g$, where $1 \leq g \leq G$, further comprising the steps of:
(c.1) performing steps (a) and (b) to process one or more of the plurality G of first subgroups to obtain a data signal representing a field vector of the first electromagnetic signal emission at each of the processed first subgroups; and
(c.2) performing steps (a) and (b) to process a second subgroup formed by at least one sensor from each of the first subgroups to normalize the field vectors across all of the processed subgroups.

31. The method of claim 26 further comprising the steps of:
(b.1) producing a data signal representing an azimuth angle $\theta_{AZ}$ of the electromagnetic signal emission field vector at the electromagnetic sensor plurality.

32. A machine-implemented method for locating an electromagnetic signal emission with respect to a plurality K of electromagnetic sensors each having a sensor axis oriented with respect to at least one dimension of a predetermined coordinate system and producing a time-varying sensor signal $B_k(t)$, wherein $1 \leq k \leq K$, the method comprising the steps of:
(a) producing a plurality K of time-varying sensor signals $\{S_k(t)\}$ representing a plurality K of time-varying sensor signals $\{B_k(t)\}$ rotated into alignment with the at least one predetermined coordinate system dimension;
(b) producing a data signal representing a K by K covariance matrix $A_T$ corresponding to the covariances of the plurality K of time-varying sensor signals $\{S_k(t)\}$ over a selected time interval, wherein covariance matrix $A_T$ is characterized by a plurality K of eigenvalues $\{\lambda_k\}$ and associated eigenvectors $\{V_k\}$; and (c) producing a data signal representing a field vector of the electromagnetic signal emission at the electromagnetic sensor plurality from which the electromagnetic signal emission location may be inferred, wherein the field vector corresponds to the eigenvector $V_1$ associated with the largest $\lambda_1$ of the eigenvalues $\{\lambda_k\}$.

33. The method of claim 32 further comprising the steps of:

(a.1) producing a data signal representing a diagonal singular value decomposition matrix $\Sigma$ of the covariance matrix $A_T$ such that $A_T = U\Sigma V^T$ and U and V are orthogonal matrices;

(a.2) producing a data signal representing the plurality K of eigenvalues $\{\lambda_k\}$ and associated eigenvectors $\{V_k\}$ corresponding to the diagonal singular value decomposition matrix $\Sigma$.

34. The method of claim 32 wherein a plurality J of the K sensors are selected to form a plurality G of first subgroups each having a plurality $J_g < K$ of the sensor signals $\{S_j(t)\}_g$, where $1 \leq g \leq G$, further comprising the steps of:

(c.1) performing steps (a) and (b) to process one or more of the plurality G of first subgroups to obtain a data signal representing a field vector of the electromagnetic signal emission at each of the processed first subgroups; and (c.2) performing steps (a) and (b) to process a second subgroup formed by at least one member from each of the first subgroups to normalize the field vectors across all of the processed subgroups.

* * * * *